(12) United States Patent
Hirabayashi et al.

(10) Patent No.: US 7,594,445 B2
(45) Date of Patent: Sep. 29, 2009

(54) FORCE SENSOR

(75) Inventors: Yusuke Hirabayashi, Wako (JP); Takeshi Ohsato, Wako (JP); Nobuhiro Sakurai, Wako (JP); Shigenori Yasuie, Wako (JP); Hiroshi Yokobayashi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 114 days.

(21) Appl. No.: 11/475,957

(22) Filed: Jun. 28, 2006

(65) Prior Publication Data

US 2007/0006668 A1   Jan. 11, 2007

(30) Foreign Application Priority Data

Jun. 28, 2005   (JP) .......................... P2005-189017

(51) Int. Cl.
*G01D 7/00* (2006.01)
*G01L 1/22* (2006.01)

(52) U.S. Cl. .............................. 73/862.044; 73/862.041

(58) Field of Classification Search ................................ 73/862.041–862.045, 764
See application file for complete search history.

(56) References Cited

U.S. PATENT DOCUMENTS

| | | | | |
|---|---|---|---|---|
| 4,295,117 A | * | 10/1981 | Lake et al. ...................... 338/4 |
| 4,448,083 A | * | 5/1984 | Hayashi ................... 73/862.042 |
| 4,454,771 A | | 6/1984 | Shimazoe et al. | |
| 4,905,523 A | * | 3/1990 | Okada ................... 73/862.044 |
| 5,095,762 A | * | 3/1992 | Holm-Kennedy et al. ...................... 73/862.041 |
| 5,263,375 A | | 11/1993 | Okada | |
| 6,148,671 A | * | 11/2000 | Nakamizo et al. ......... 73/514.34 |
| 6,530,283 B2 | * | 3/2003 | Okada et al. ................... 73/780 |
| 6,951,142 B2 | * | 10/2005 | Ohsato et al. .......... 73/862.041 |
| 6,990,867 B2 | * | 1/2006 | Okada ......................... 73/780 |
| 2003/0140713 A1 | * | 7/2003 | Ohsato et al. ........... 73/862.041 |
| 2005/0081645 A1 | * | 4/2005 | Ohsato et al. ........... 73/862.041 |
| 2006/0174718 A1 | * | 8/2006 | Morimoto ............... 73/862.044 |
| 2007/0000335 A1 | * | 1/2007 | Morimoto ............... 73/862.045 |

FOREIGN PATENT DOCUMENTS

| | | |
|---|---|---|
| EP | 1 327 870 A2 | 7/2003 |
| EP | 1 653 208 A2 | 5/2006 |
| JP | 64-75930 A | 3/1989 |
| JP | 2003-254843 A | 9/2003 |

OTHER PUBLICATIONS

Gale, Bruce. "Bonding, Packaging and Sacrificial Processes" Lecture notes from Oct. 11, 2001. Published online May 12, 2004. Accessed Mar. 31, 2008. <http://www.eng.utah.edu/~gale/mems/Lecture%2016a%20Bonding.pdf>.*

* cited by examiner

*Primary Examiner*—Lisa M Caputo
*Assistant Examiner*—Jonathan Dunlap
(74) *Attorney, Agent, or Firm*—Birch, Stewart, Kolasch & Birch, LLP

(57) ABSTRACT

A force sensor comprises a force sensor chip, and a buffering device for dampening and applying incoming external force to the force sensor chip. The buffering device comprises an input portion to which external force is input, a sensor mount for fixing the force sensor chip to the exterior, a dampening mechanism for dampening external force, and a transmission portion for transmitting the dampened external force to the active sensing portion.

10 Claims, 20 Drawing Sheets

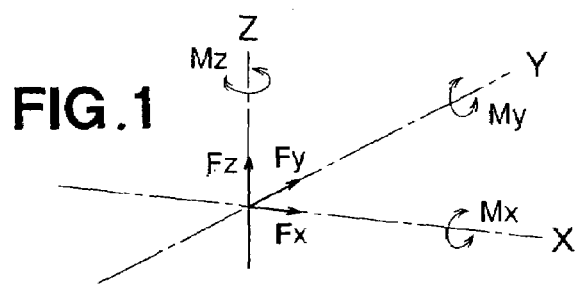
FIG.1
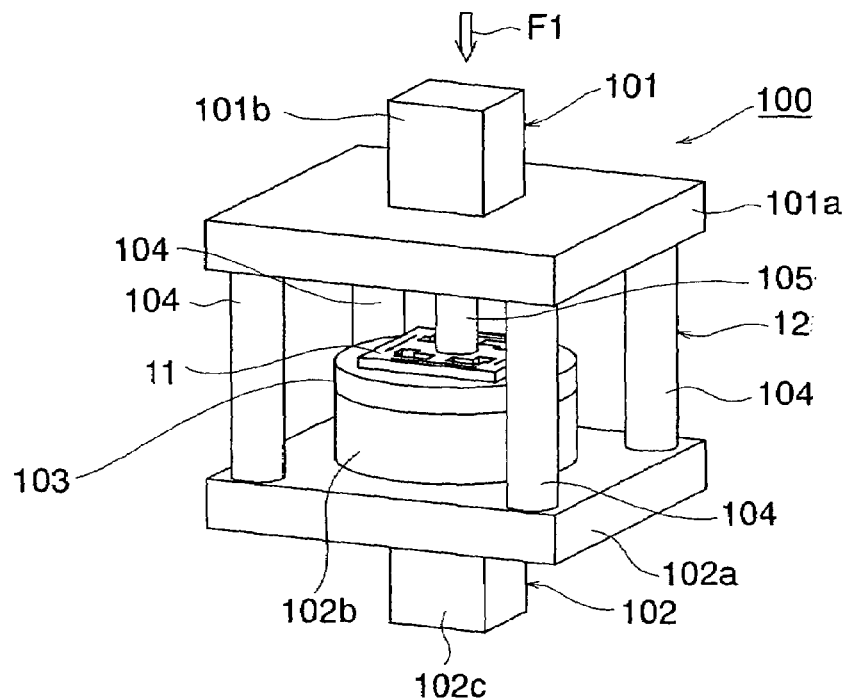
FIG.2
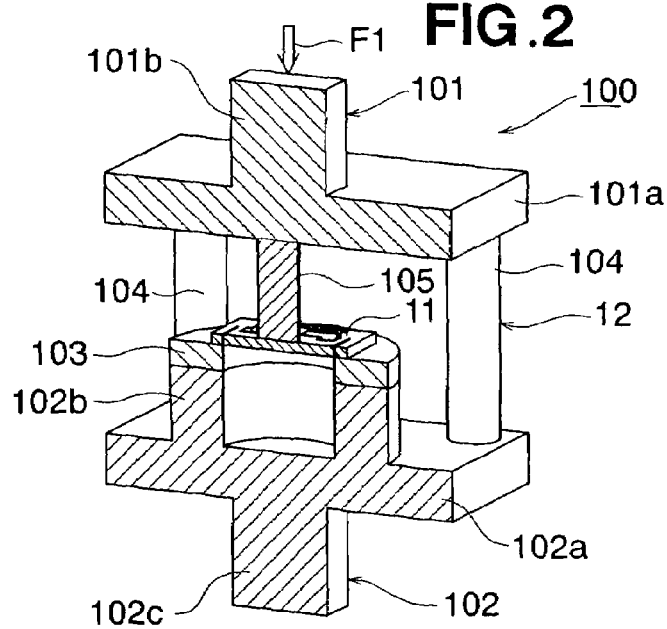

FIG.5

| | APPLIED AXIAL FORCE | Fx APPLIED | Fz APPLIED | My APPLIED | Mz APPLIED |
|---|---|---|---|---|---|
| (1) | DEFORMATION PATTERN | | | | |
| (2) | (sensor layout with R11, R12, R13, R21, R22, R23, R31, R32, R33, R41, R42, R43) | | | | |
| (3) | DETECTION SIGNAL | $((R21-R23)+(R43-R41))/4$ | $-(R12+R22+R32+R42)/4$ | $(R12-R32)/2$ | $((R13-R11)+(R23-R21)+(R33-R31)+(R43-R41))/8$ |

FIG. 6A Fx APPLIED FIG. 6B Fz APPLIED FIG. 6C My APPLIED FIG. 6D Mz APPLIED

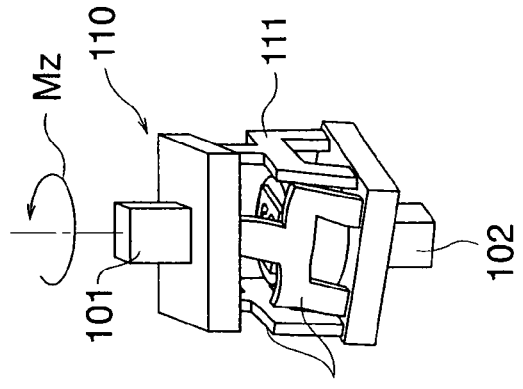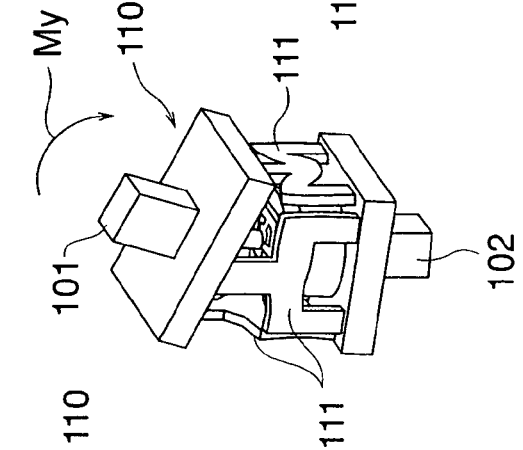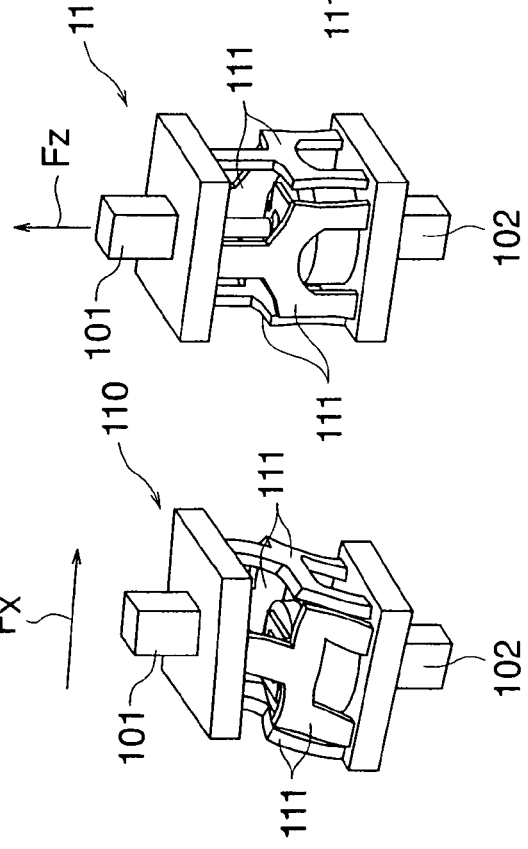

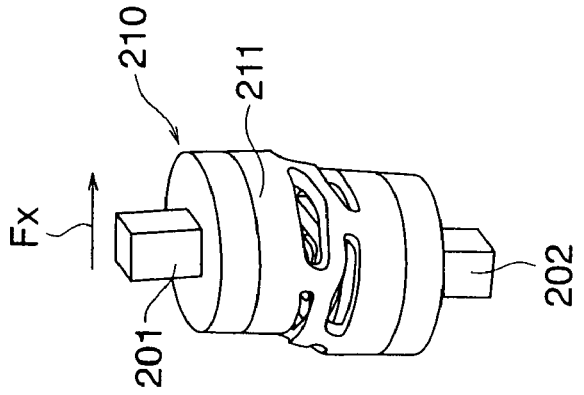
FIG. 15A Fx APPLIED
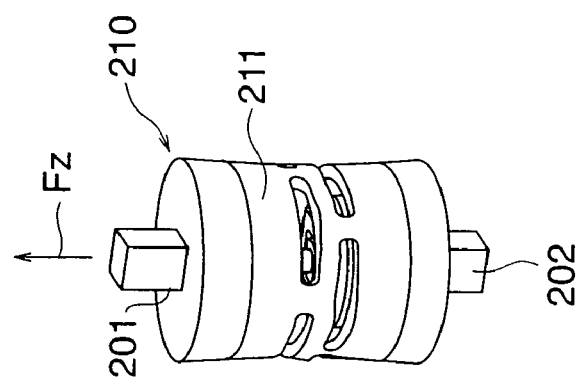
FIG. 15B Fz APPLIED
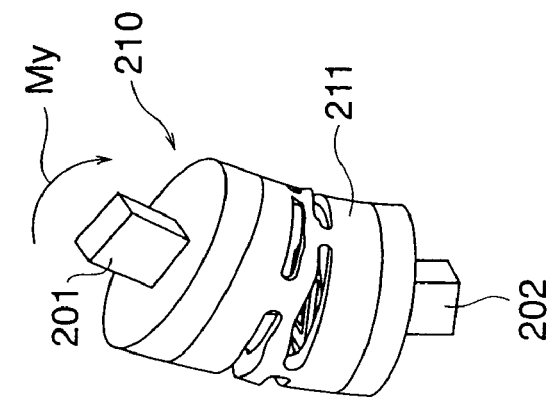
FIG. 15C My APPLIED
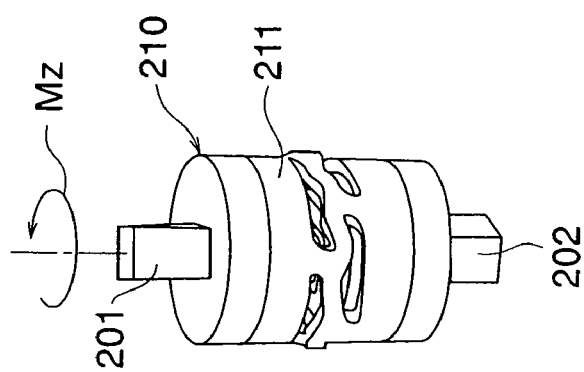
FIG. 15D Mz APPLIED

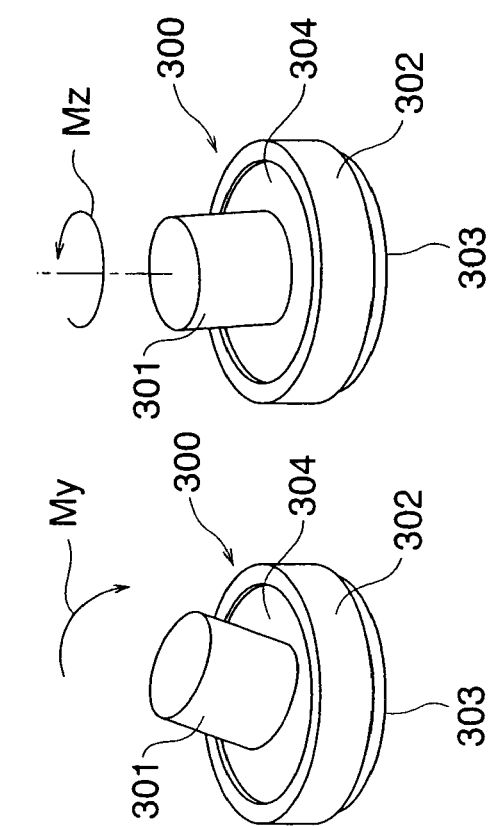
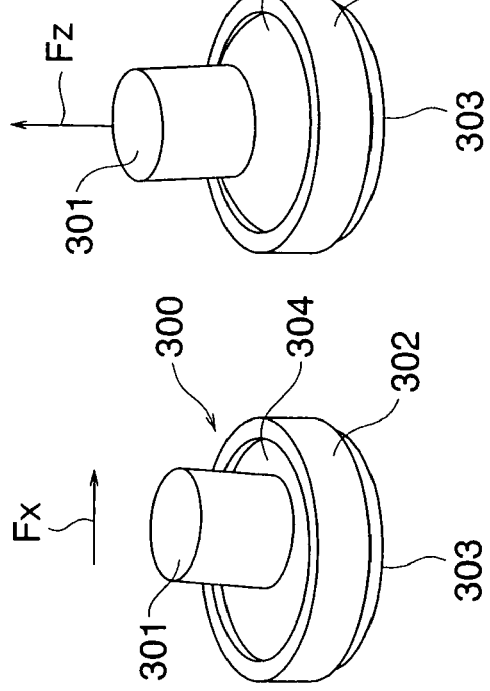
FIG. 18A Fx APPLIED  FIG. 18B Fz APPLIED  FIG. 18C My APPLIED  FIG. 18D Mz APPLIED

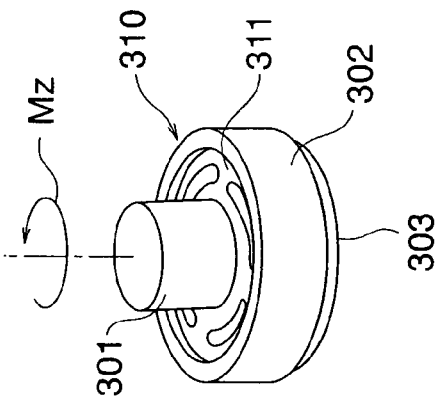
FIG.21A Fx APPLIED
FIG.21B Fz APPLIED
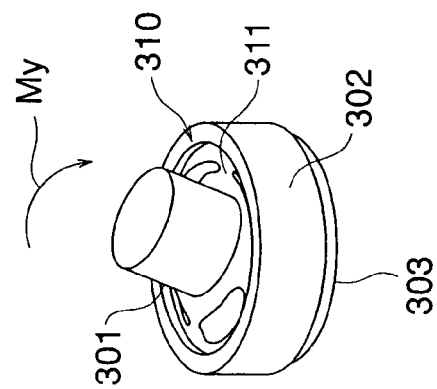
FIG.21C My APPLIED
FIG.21D Mz APPLIED
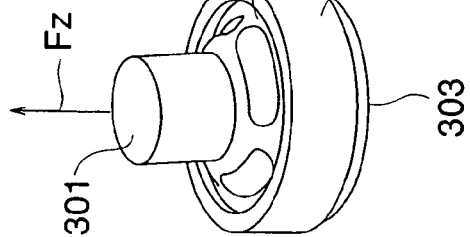
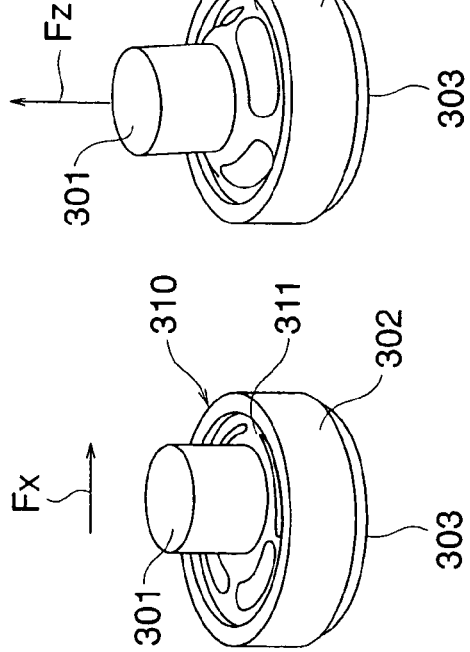

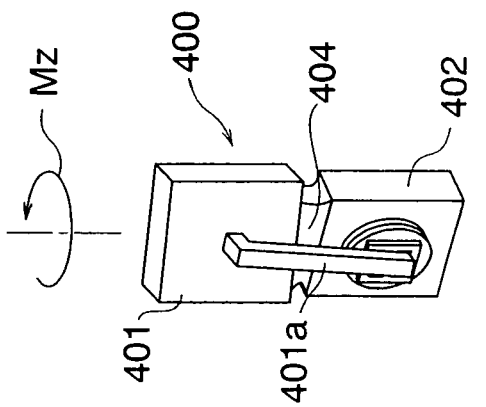
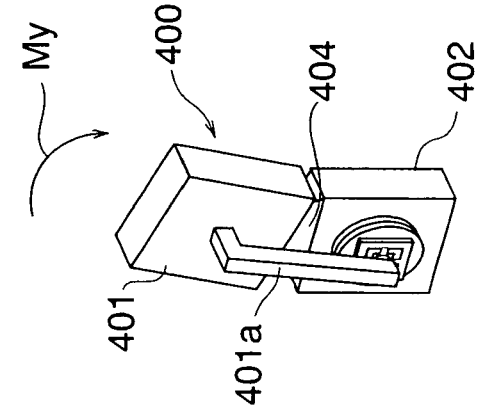
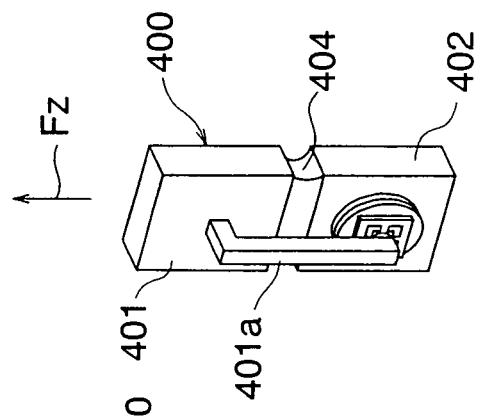
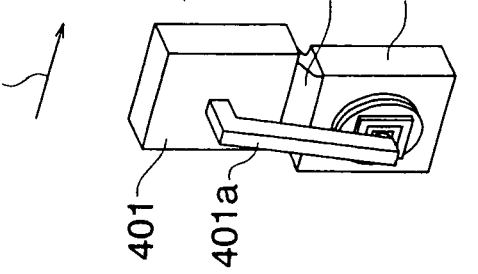

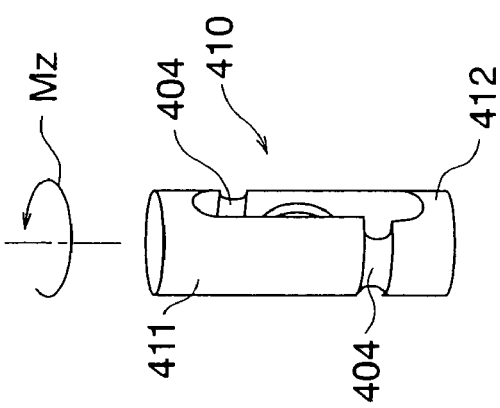
FIG. 27A Fx APPLIED
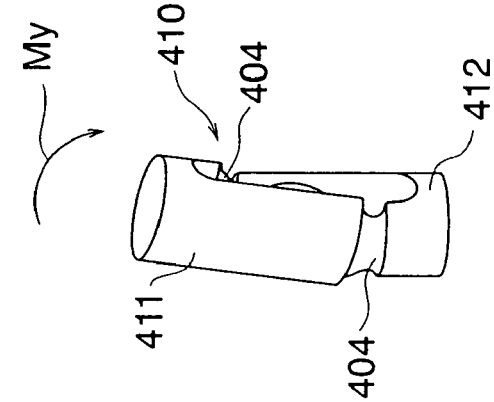
FIG. 27B Fz APPLIED
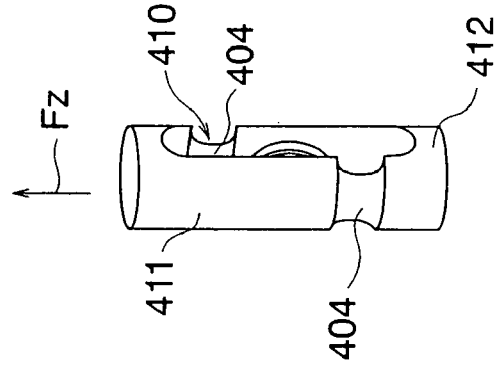
FIG. 27C My APPLIED
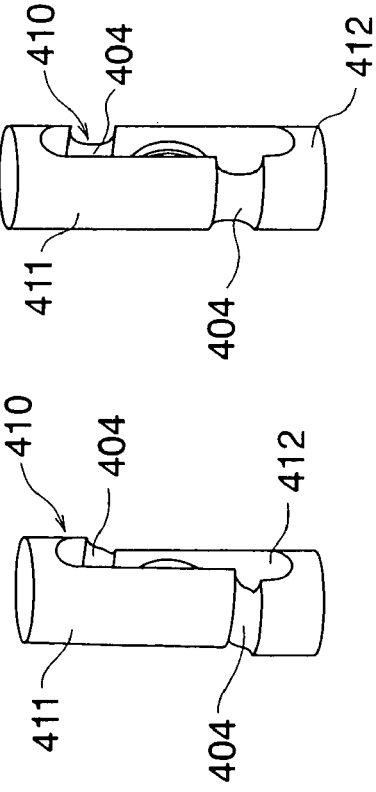
FIG. 27D Mz APPLIED

FORCE SENSOR

FIELD OF THE INVENTION

The present invention relates to a force sensor, and more particularly relates to a force sensor provided with a buffering device that is suitable for reducing the force applied to a force sensor chip.

BACKGROUND OF THE INVENTION

The present inventors have previously proposed a six-axis force sensor disclosed in JP-A-2003-254843. In this six-axis force sensor, buffering devices are disposed about the periphery of the six-axis force sensor so as to reduce the magnitude of external force applied to the external force application portion (force-exerting unit) of the six-axis force sensor chip of the semiconductor substrate. The level of external force that can thereby be measured by the six-axis force sensor is dramatically increased, and the range of application can be expanded. Also, the six-axis force sensor can solve the problem of multiaxial interference even if the structure is provided with a buffering device.

A force/moment detector is disclosed in JP-A-1-75930 (Japanese Patent 2607096). In this force/moment detector, a total of 12 resistance elements are formed on a single crystal silicon substrate, as shown in FIG. 1 and other drawings in JP-A-1-75930, and a transducer for converting mechanical deformations into electric signals is included. In the force/moment detector described above, a first strain element and a second strain element are provided, the single crystal substrate is disposed on the first strain element, and the first and second strain elements are connected by an arm-like member.

In a force sensor such as the one described above, there are cases in which a semiconductor sensor chip is used in which semiconductor technology is used for the portion that senses force and moment. Since a semiconductor sensor chip uses a semiconductor substrate to form a portion that receives external force, there is a limit to the force that can be applied. When excessive force or moment is applied, the chip on the semiconductor substrate is liable to be damaged. In view of this situation, a buffering device is preferably provided. This device has an external force-dampening mechanism that weakens external force in order to protect the chip that constitutes the force sensor. When a force sensor is furthermore used, for example, in an external force application unit in an industrial robot or the like, an excessively large buffering device cannot be used due to installation space constraints. From the viewpoint of installation location, installation space, and other considerations related to the interior of a robot or other apparatus, there is a need to develop a buffering device for a force sensor modified in a variety of ways to have a more optimal form and structure.

There is therefore a need for a force sensor that can suitably moderate axial force applied to the force sensor chip and can be installed in an optimal shape or mounting state in accordance with the installation location, installable space, and other considerations.

SUMMARY OF THE INVENTION

According to an aspect of the present invention, there is provided a force sensor comprising: a force sensor chip having an active sensing portion to which a force is applied, a support portion for supporting the active sensing portion, and a force detector for detecting the force between the active sensing portion and the support portion; and a buffering device for dampening and applying the imparted external force to the force sensor chip, wherein the buffering device comprises an input portion to which the external force is input, a sensor mount for fixing the force sensor chip, a dampening mechanism for dampening the external force, and a transmission portion for transmitting dampened external force to the active sensing portion.

In the above-described force sensor, the external or axial force applied to the active sensing portion of the force sensor chip made of a semiconductor substrate or the like can be dampened to a required level by providing a dampening or buffering mechanism that dampens the external force and applies a part of the external force to the force sensor chip. Considerable external force can thereby be detected. The dampening mechanism that has an external force buffering effect functions as a principal component of the buffering device in a force sensor. Such a buffering device can be manufactured in the form of a cube, cylinder, disc, rod, or other modified shape in accordance with the shape and structure of the dampening mechanism. As a result, a force sensor having such a buffering device can itself be manufactured in various shapes and forms. Force sensors having a large number of variations can expand the range of use and application, and force sensors having an optimal shape and other features can be mounted in the intended location.

Preferably, the force detector comprises a plurality of strain resistance elements that are disposed in connection sections in which the active sensing portion and the support portion are connected.

Desirably, the force detector comprises an electrostatic capacitance detection element for detecting the force by using variation in electrostatic capacitance between first electrodes disposed in the active sensing portion, and second electrodes disposed in a fixing portion other than the active sensing portion.

In a preferred form, the input portion and the sensor mount have a plate-like part, and the input portion and the sensor mount are coupled by the dampening mechanism. The input portion and the sensor mount are each formed as a sensor casing that forms the exterior of the force sensor. When the plate-like part having a square shape or another shape is formed as a portion of the casing, the input portion and sensor mount are coupled by the dampening mechanism, and the external force applied to the input portion is dampened by the dampening mechanism.

Preferably, the dampening mechanism comprises a columnar member disposed on the periphery of the input portion and the sensor mount.

Desirably, the dampening mechanism comprises a Y-shaped connecting member disposed on the periphery of the input portion and the sensor mount. The material, shape, dimensions, and other features of the connecting member can be arbitrarily modified in order to produce the required buffering effect.

It is preferred that the connecting member comprises a member having a single-end portion coupled to the input portion, and a two-end portion coupled to the sensor mount. The connecting member is formed in the shape of the letter "Y," and the rigidity of the member can be modified by suitably adjusting the shape and other features of the member.

In a preferred form, the input portion and the sensor mount are coupled by the columnar dampening mechanism which internally accommodates the force sensor chip.

Preferably, the dampening mechanism comprises a cylindrical member.

It is preferred that the cylindrical member has a plurality of elongated holes formed in the circumferential direction. The rigidity of the cylindrical member can be appropriately modified by adjusting the shape, number, position, and other features of the holes.

The input portion, the sensor mount, the dampening mechanism, and the transmission portion may be disposed on the same side as the force sensor chip; and the dampening mechanism and the transmission portion are formed on the internal peripheral side of the sensor mount.

It is desirable that the dampening mechanism has a plurality of holes formed therein. The rigidity of the dampening mechanism can be appropriately adjusted by appropriately modifying the holes.

Desirably, the input portion and the sensor mount are coupled in the form of a rod by way of the dampening mechanism, the force sensor chip is disposed on the side surface of the sensor mount, and an arm portion in which one end is connected to the input portion is connected by another end to the transmission portion.

It is desired that the input portion and the sensor mount are formed so as to have internal space when connected by way of the dampening mechanism, and the force sensor chip is disposed on the sensor mount so as to be positioned in the internal space.

Preferably, the input portion-and the sensor mount are coupled at both ends by using a dampening mechanism.

Preferably, the material for forming the dampening mechanism has lower rigidity than does the material for forming the input portion and the sensor mount. The configuration even more preferably comprises a chip base between the force sensor chip and the sensor mount, and the chip base is anodically bonded between the force sensor chip and the sensor mount.

In accordance with the present invention, the force sensor is provided with a buffering device; the buffering device is formed with an input portion, a sensor mount, a transmission portion, and a dampening or buffering mechanism; and the force sensor can be manufactured in a large number of variations by arbitrarily modifying the shape and pattern of the input portion, sensor mount, and dampening mechanism in accordance with usage or application conditions. The axial force applied to the force sensor chip can thereby be appropriately weakened, and the force sensor chip can be installed in an optimal shape and mounting state in accordance with the installation location, installable space, and other factors.

BRIEF DESCRIPTION OF THE DRAWINGS

Certain preferred embodiments of the present invention will be described in detail below, by way of example only, with reference to the accompanying drawings, in which:

FIG. 1 is an external perspective view of a force sensor showing the first embodiment of the force sensor of the present invention;

FIG. 2 is a cross-sectional perspective view of the force sensor of the first embodiment;

FIG. 5 is a diagram showing the deformation patterns force sensor and formulas for expressing the detection signal with respect to four types of axial forces (Fx, Fz, My, Mz) in the force sensor chip;

FIGS. 9A to 9D are perspective views showing the deformation states that correspond to the four-types of axial forces (Fx, Fz, My, Mz), respectively, of the force sensor of a modified example of the first embodiment;

FIGS. 15A to 15D are perspective views showing the deformation states that correspond to the four-types of axial forces (Fx, Fz, My, Mz), respectively, of the force sensor of a modified example of the second embodiment;

FIGS. 18A to 18D are perspective views showing the deformation states that correspond to the four-types of axial forces (Fx, Fz, My, Mz), respectively, of the force sensor of the third embodiment;

FIGS. 21A to 21D are perspective views showing the deformation states that correspond to the four-types of axial forces (Fx, Fz, My, Mz), respectively, of the force sensor of a modified example of the third embodiment;

FIGS. 24A to 24D are perspective views showing the deformation states that correspond to the four-types of axial forces (Fx, Fz, My, Mz), respectively, of the force sensor of the fourth embodiment;

FIGS. 27A to 27D are perspective views showing the deformation states that correspond to the four-types of axial forces (Fx, Fz, My, Mz), respectively, of the force sensor of a modified example of the fourth embodiment;

DETAILED DESCRIPTION OF THE PREFERRED EMBODIMENTS

As a sensor device, the force sensor of the present invention is generally composed of a sensor portion, i.e., a force sensor chip that detects and senses external force (or axial force, load) applied from the outside, and a buffering device that includes a dampening or buffering mechanism for dampening by a prescribed amount the external force applied to the force sensor and transmitting the force to the force sensor chip.

In the description of the embodiments below, force sensors (or force sensor provided with a buffering device) are classified based on the external shape. The shape of the force sensor is determined by the mounted buffering device.

The force sensor of the first embodiment has a cube-shaped exterior. The force sensor of the second embodiment has a cylindrical exterior. The force sensor of the third embodiment has a toroidal exterior. The force sensor of the fourth embodiment has a rod-shaped exterior.

The force sensor chip is the same in each embodiment. The force sensor chip is made using a semiconductor substrate, and also functions as a six-axis force sensor. A six-axis force sensor has a sensor function for detecting the force and moment of three orthogonal axes (X-, Y-, and Z-axes).

In the description of the first to fourth embodiments below, simple shapes and structures are described, and actual shapes and structures are described as modified examples.

The first embodiment of the force sensor of the present invention is described with reference to FIGS. 1 to 9. The force sensor of this embodiment is cube-shaped.

Following is a description, made with reference to FIGS. 1 and 2, of a force sensor having a simple shape and structure according to the first embodiment. FIG. 1 is an external perspective view of a force sensor 100, and FIG. 2 is a cross-sectional perspective view of the internal structure of the force sensor 100.

Figure 3:
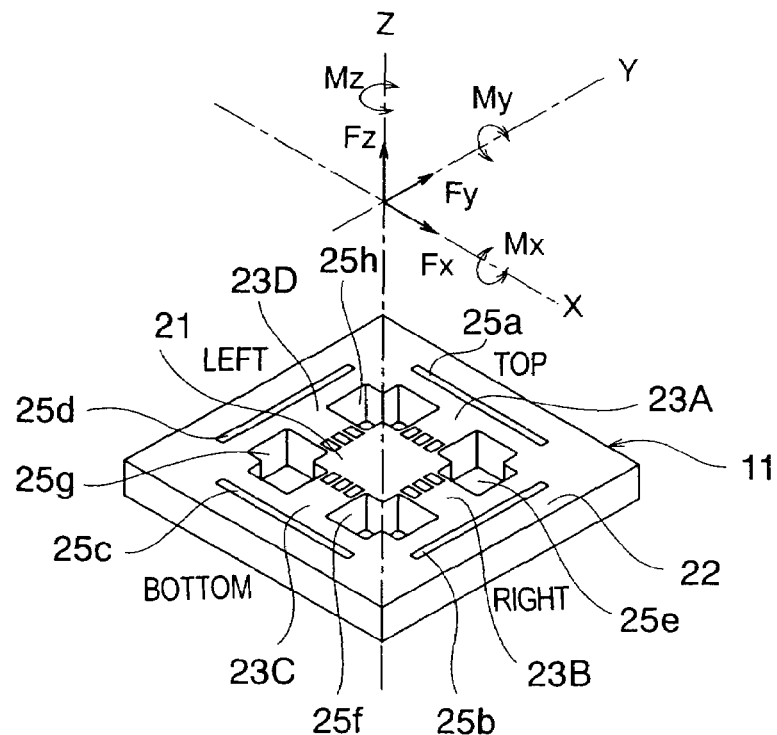
FIG. 3 is a perspective view of the force sensor chip used in the force sensor of the first embodiment.
Figure 4:
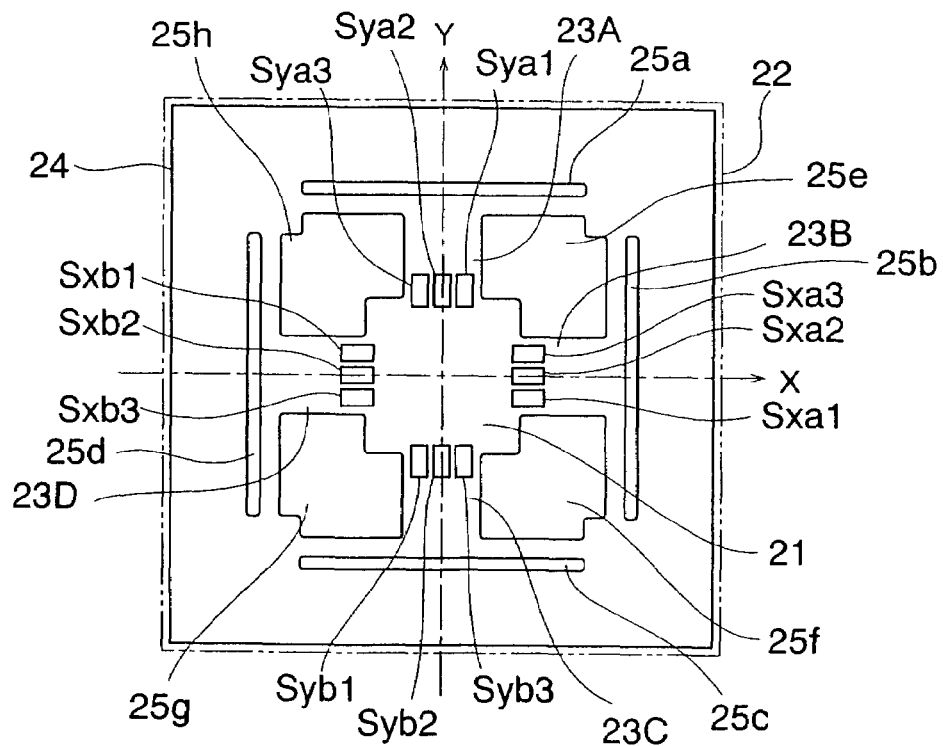
FIG. 4 is a plan view of the force sensor chip used in the force sensor of the first embodiment.

The main part of the force sensor 100 comprises a force sensor chip 11 and a buffering device 12. An example of the configuration of the force sensor chip 11 is shown in FIGS. 3 and 4. An example of the configuration of the force sensor chip 11 will be described with reference to FIGS. 3 and 4, and the configuration of the force sensor 100 will be described thereafter. The force sensor chip 11 is configured so as to detect external force by using a strain resistance element.

FIG. 3 shows a perspective view of the force sensor chip 11, and FIG. 4 shows a plan view of the force sensor chip 11. The force sensor chip 11 is a semiconductor sensor device that is formed using a semiconductor substrate and semiconductor manufacturing process technology. The plan view shape of the force sensor chip 11 is preferably square, and has a flat profile. In FIG. 3, which shows the plan view shape of the force sensor chip 11, the force sensor chip 11 is composed of an active sensing portion 21 having a substantially square shape positioned in the center of the chip, a square ring-shaped support portion 22 disposed in a peripheral position so as to encompass the active sensing portion 21, four T-shaped connecting portions 23A, 23B, 23C, and 23D that are positioned between the active sensing portion 21 and support portion 22 and which connect the two portions in correspondence with the portions on the four sides. Each of the four connecting portions 23A to 23D forms a T-bridge and has a bridge portion and an elastic portion. Each of the four T-shaped connecting portions 23A to 23D has three strain resistance elements (Sxa1, Sxa2, Sxa3), (Sxb1, Sxb2, Sxb3), (Sya1, Sya2, Sya3), and (Syb1, Syb2, Syb3) preferably disposed on one of the surfaces (surface 24) of the boundary portion connected to the active sensing portion 21.

The active sensing portion 21, support portion 22, and connecting portions 23A to 23D are formed by eight through-holes 25a to 25h provided to the force sensor chip 11, as shown in FIG. 3. The through-holes 25a to 25h generate a displacement in the active sensing portion 21 and a deformation in the connecting portions 23A to 23D in accordance with the external force applied to the active sensing portion 21, and the formation position and shape of the through-holes is adjusted so that force can be detected with high precision.

In FIGS. 3 and 4, the X-, Y-, and Z- axes, which are in a mutually orthogonal relationship, are defined as shown in the diagram with respect to the force sensor chip 11. In FIG. 3, up, down, right, and left in the force sensor chip 11 are established for the sake of convenience. In FIG. 4, the horizontal axis is defined as the X-axis, and the vertical axis is defined as the Y-axis. In FIG. 3, the arrows and reference numerals indicate the force and moment related to each axis. In relation to the three axes (X-axis, Y-axis, and Z-axis) of a rectangular coordinate system, Fx is defined as the force in the X-axis direction, Fy is the force in the Y-axis direction, and Fz is the force in the Z-axis direction. Also, Mx is defined as the moment applied in the rotational direction with respect to the X-axis, My is the moment applied in the rotational direction with respect to the Y-axis, and Mz is the moment applied in the rotational direction with respect to the Z-axis.

When the above-mentioned six axial components (six axial forces), i.e., Fx [N], Fy [N], Fz [N], Mx [N·cm], My [N·cm], and Mz [N·cm], are directly applied to the active sensing portion 21 of the force sensor chip 11 to which the support portion 22 is fixed, deformation is generated in the connecting portions 23A to 23D in accordance with the applied force of the six axial components. Since the strain resistance elements (Sxa1, Sxa2, Sxa3), (Sxb1, Sxb2, Sxb3), (Sya1, Sya2, Sya3), and (Syb1, Syb2, Syb3) experience strain in accordance with the deformation of the connecting portions 23A to 23D, the magnitude and direction of the six axial forces can be detected by analyzing the signals from the strain resistance elements (Sxa1, Sxa2, Sxa3), (Sxb1, Sxb2, Sxb3), (Sya1, Sya2, Sya3), and (Syb1, Syb2, Syb3).

In an actual force sensor chip 11, electrodes are disposed about the periphery of the chip, and wiring for connecting the electrodes and the strain resistance elements is provided, but since these are not essential components of the present invention, they have been omitted from FIGS. 3 and 4.

Figure 6:
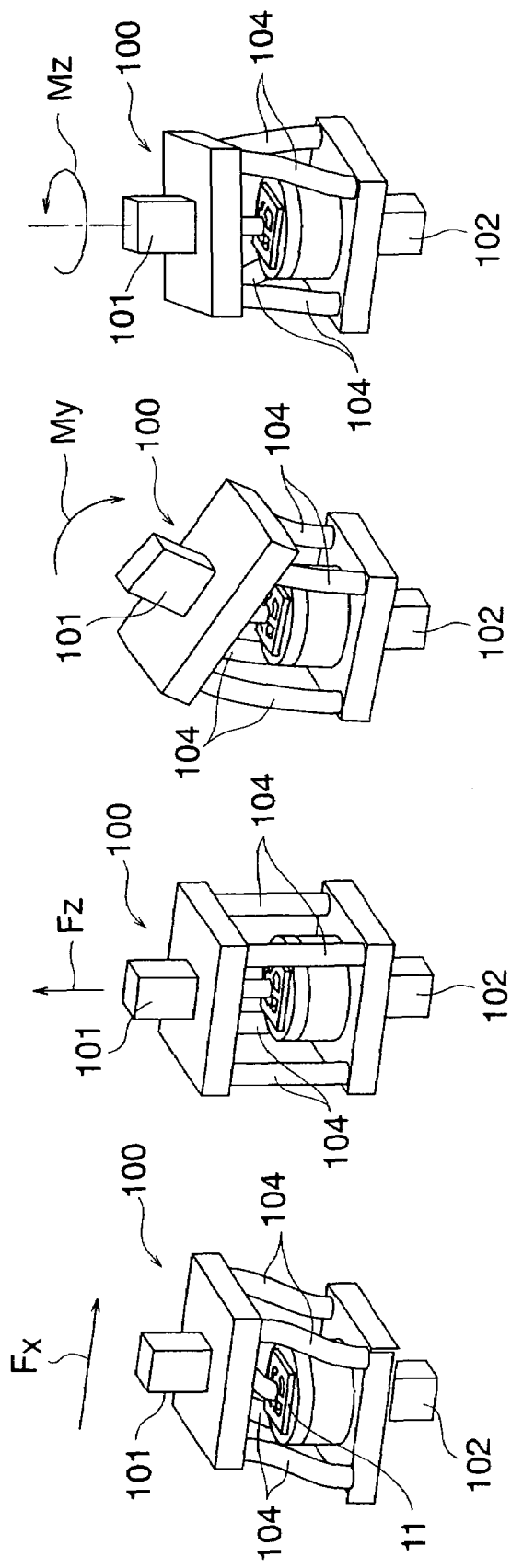
FIGS. 6A to 6D are perspective views showing the deformation states that correspond to the four-types of axial forces (Fx, Fz, My, Mz), respectively, of the force sensor of the first embodiment.

A general description of an example of the method for detecting the magnitude and direction of the six axial forces is provided with reference to FIGS. 5 and 6. For convenience of description, the deformation patterns 31 shown in FIG. 5 are exaggerated depictions of the deformation states. Any of the six axial forces or a combination of the forces is applied to the active sensing portion 21 in the center of the force sensor chip 11, as described above. The active sensing portion 21 to which axial forces are applied varies in position while being supported by the connecting portions 23A to 23D and the support portion 22 of the chip peripheral area. As a result, specific deformations that correspond with the applied axial force are generated in the connecting portions 23A to 23D that connect the active sensing portion 21 and support portion 22. When a deformation occurs in the connecting portions 23A to 23D, a specific detection signal is output in accordance with the manner of deformation.

FIG. 5 shows the deformation pattern ((2) in FIG. 5) of the force sensor chip 11 and the characteristic detection signal ((3) in FIG. 5) that corresponds to applied axial force when the axial force applied to the active sensing portion 21 is Fx, Fx, My, and Mz ((1) in FIG. 5). The deformation patterns of the force sensor chip 11 are shown as a plan view of the deformation patterns 31 and a longitudinal sectional view of the deformation patterns 32. The detection signals are expressed as computational formulas of the increase or decrease in resistance values. In this case, the resistance variations R11, R12, R13, R21, R22, R23, R31, R32, R33, R41, R42, and R43 used in the computational formulas of the increase or decrease in resistance values are designated as (R11, R12, R13), (R31, R32, R33), (R21, R22, R23), and (R41, R42, and R43) for the above-described 12 strain resistance elements (Sxa1, Sxa2, Sxa3), (Sxb1, Sxb2, Sxb3), (Sya1, Sya2, Sya3), and (Syb1, Syb2, Syb3), respectively.

When an axial force Fx is applied, the force is applied as indicated by the arrow 33, and a detection signal that is determined by the computation formula ((R21−R23)+(R43−R41))/4 is obtained as a significant output signal, as shown in FIG. 5. When an axial force Fz is applied, the force is applied as indicated by the arrow 34, and a detection signal that is determined by the computation formula −(R12+R22+R32+R42)/4 is obtained as a significant output signal. When an axial force My is applied, the force is applied as indicated by the arrow 35, and a detection signal that is determined by the computation formula (R12−R32)/2 is obtained as a significant output signal. When an axial force Mz is applied, the force is applied as indicated by the arrow 36, and a detection signal that is determined by the computation formula ((R13−R11)+(R23−R21)+(R33−R31)+(R43−R41)/8 is obtained as a significant output signal. These signals are appropriately computed (by known matrix operations or the like), and the axial force applied to the force sensor 100 can be known.

A bridge circuit may be formed in the force sensor chip 11, and a noise-free detection signal may be output from the force sensor 100. The system may be configured so that the six axial forces are detected in greater detail, and the magnitude, direction, and other parameters of the force can be confirmed with a monitor, for example, by connecting an external measuring device (not shown) to the exterior of the force sensor 100 and processing the output signal from the strain resistance elements (Sxa1, Sxa2, Sxa3) by using the external measuring device. The details of the wiring and operation of the force sensor chip 11 according to the present invention can be the same as those disclosed in Japanese Laid-open Patent Application No. 2003-254843, for example.

An example is shown in FIGS. 3 to 5 in which three strain resistance elements are disposed on each of the connecting portions 23A to 23D of the force sensor chip 11, but the force sensor chip 11 may be configured with two strain resistance elements disposed on each of the connecting portions 23A to 23D. In this case, the significant output signals for the applied forces in (3) in FIG. 5 are −(R11+R13+R21+R23+R31+R33+R41+R43)/8 and ((R11+R13)−(R31+R33))/4 in the case of Fz and Mz, respectively. The signals related to Fx and Mz are the same as those shown in FIG. 5.

Turning back to FIGS. 1 and 2, the configuration of the force sensor 100 on the basis of the stated diagrams is described next.

As described above, the force sensor 100 is composed of the above-described force sensor chip 11 and buffering device 12. The buffering device 12 is composed of an input portion 101 to which external force F1 is directly applied; a sensor mount 102 for fixing the force sensor 100 in a required location and mounting the force sensor chip 11; a dampening mechanism 104 composed, for example, of four columnar members having a dampening function or a buffering function; and a transmission portion 105. In the sensor mount 102, the force sensor chip 11 is mounted on a chip base 103. The chip base 103 can be formed as part of the sensor mount 102 or as a separate member from the sensor mount 102.

The support portion 22 of the force sensor chip 11 described above is fixed to the annular chip base 103. The sensor mount 102 is composed of a cylindrical portion 102b to whose upper surface the chip base 103 is fixed, and a supporting plate 102a having the cylindrical portion 102b. The input portion 101 comprises the supporting plate 102a of the sensor mount 102, and a rectangular plate 101a having substantially the same shape. The plate 101a of the input portion 101 and the supporting plate 102a of the sensor mount 102 are essentially disposed in parallel. The dampening mechanism 104 is placed between the plate 101a of the input portion 101 and the supporting plate 102a of the sensor mount 102 by using the four corresponding corner portions of the plates, and the input portion 101 and sensor mount 102 are connected to each other. Also, the center area inside the plate 101a of the input portion 101 and the center area of the active sensing portion 21 of the force sensor chip 11 fixed to the sensor mount 102 are connected by the above-described rod-shaped transmission portion 105.

The centers of the input portion 101, sensor mount 102, chip base 103, transmission portion 105, and force sensor chip 11 substantially match each other as viewed from above. The symmetry of the force detection and application direction of the external force F1 is thereby easily assured.

Holding portions 101b and 101c are disposed in the center areas of the plates 101a and 102a, respectively. The force sensor 100 can thereby be easily mounted and held in place. The symmetry of the sensor detection values is maintained by disposing the holding portion 101b directly above the transmission portion 105, and excessive fluctuation is prevented. Lathe machining is made possible and the surface area on the supporting plate 102a can be effectively used at the same time by providing a cylindrical shape to the cylindrical portion 102b and chip base 103. More specifically, even if the plates 101a and 102a have a small surface area, the dampening mechanism 104 can be disposed in the four corners of the plates, and the chip base 103 can also be mounted in the center. By adopting a structure such as that shown in FIG. 1, flexible cables can be easily connected to electrodes (not shown) disposed along the four sides of the force sensor chip 11. In the force sensor 100, sensing is facilitated even if a relatively small force is applied to the active sensing portion 21. This is because the transmission portion 105 is in contact with the same surface as the chip surface on which the strain resistance elements are disposed.

In the above-described configuration, the dampening mechanism 104 formed with four columns dampens the external force F1 so that the external force F1 applied to the input portion 101 is weakened and applied to the active sensing portion 21 of the force sensor chip 11 with a force and moment that is within the tolerance range. In other words, when an external force F1 is applied to the input portion 101 of the force sensor 100, the majority of the force (90% of the external force F1, for example) is transmitted to the sensor mount 102 by way of the dampening mechanism 104, and a part of the force (10% of the external force F1, for example) is applied to the active sensing portion 21 of the force sensor chip 11 by way of the transmission portion 105. The force transmission ratio to the force sensor chip 11 is determined by appropriately adjusting the shape, size, material, and other parameters of the components constituting the buffering device 12, including the dampening mechanism 104. The force sensor 100 is preferably designed so that an external force F1 can be detected with good precision without damage or permanent deformation, with consideration given to the load carrying capacity, rigidity, and other aspects of the force sensor chip 11 and buffering device 12.

Following is a description of the material and composition of the components of the above-described force sensor 100.

The input portion 101, sensor mount 102, chip base 103, dampening mechanism 104, and transmission portion 105 of the force sensor 100 are commonly formed from metal (aluminum, carbon steel, stainless steel, or the like), plastic, ceramic, glass, or another solid material.

In the above description, two or more metals may be used, but considering the manufacturing process and costs, it is more realistic to form the input portion, sensor mount, and other components of the sensor casing by using a single metal, and to adjust the deformation effect by modifying the manner and other aspects in which the shape, size, and slits (holes) are selected. The use of ceramic or glass as the material is a preferred choice because thermal expansion can be reduced.

The chip base 103 particularly preferably has insulation properties in order to keep the sensor precision high in the force sensor 100, and is preferably a material that has a coefficient of thermal expansion that is approximately the same as that of the force sensor chip 11. If the coefficients of thermal expansion are dissimilar, the force sensor chip 11 sometimes expands due to changes in the outside temperature. This causes the force sensor 100 to produce detection errors (temperature drift). Bias voltage is ordinarily applied to and the effect of noise eliminated in order to extract the detection signal from the force sensor 100. However, the chip base 103 preferably has insulation properties so that the bias voltage is not applied to other components. From this viewpoint, ceramic or glass is advantageous.

Glass is particularly preferably selected as the chip base 103 because the base is anodically bonded to the force sensor chip 11 and cylindrical portion 102b of the sensor mount 102. However, a conventional epoxy resin or other adhesive may be used in place of anodic bonding. A phenolic adhesive with excellent heat resistant properties may be used depending on the service mode of the sensor.

The input portion 101; the sensor mount 102; the plate 101a and supporting plate 102a, which are elements of the sensor mount; and the transmission portion 105 preferably should experience little deformation due to applied external force F1. These components are formed from metal or another rigid material. Invar, Elinvar, or another alloy with a low coefficient of thermal expansion is preferably used because, depending on the application, a coefficient of thermal expansion that is approximate to that of the force sensor chip 11 is advantageous in terms of sensor detection precision.

The dampening mechanism 104 composed of columnar members must have suitable rigidity because a suitable amount of deformation is produced by an external force F1 applied to the input portion 101, and an external force F1 can thereby be detected by deforming the force sensor chip 11 in accordance with the amount of deformation. Invar, Elinvar, or another alloy with a low coefficient of thermal expansion is preferably used because, depending on the application, a coefficient of thermal expansion that is approximate to that of the force sensor chip 11 is advantageous in terms of sensor detection precision.

The rigidity of the dampening mechanism 104 is adjusted by the shape, size, and other parameters of the mechanism, but the dampening mechanism may also be formed from a different material that is less rigid than the input portion 101 and other components.

Even more preferably, the dampening mechanism is generally formed from a low-rigidity material or is provided with a large structure in which the amount of deformation is considerable in comparison with the other sensor casing portions (input portion 101 and sensor mount 102). When the mechanism is made of a material with the same rigidity as the input portion 101 and other components, the amount of deformation is adjusted so as to be greater than that of the input portion 101 and other components by modifying the shape and structure of the mechanism. The specific modes of implementation related to the dampening mechanism are described in the embodiments.

The material and composition of the input portion, sensor mount, chip base, dampening mechanism, and transmission portion in the force sensor described above are the same for the components of the force sensors described in the embodiments below.

FIGS. 6A to 6D show modified examples of the overall shape of the force sensor 100 when axial forces Fx, Fz, My, and Mz, for example, are applied to the force sensor 100. FIG. 6A shows the deformation state when an axial force Fx is applied. FIG. 6B shows the deformation state when an axial force Fz is applied. FIG. 6C shows the deformation state when an axial force My is applied. FIG. 6D shows the deformation state when an axial force Mz is applied. The dampening mechanism 104 deforms in accordance with the axial forces that produce the deformation states shown in FIGS. 6A to 6D, and the dampening mechanism 104 absorbs a majority (e.g., 90%) of the axial force applied to the input portion 101. For convenience of description, the deformation states of the deformation patterns shown in FIGS. 6A to 6D are exaggerated depictions.

Figure 7:
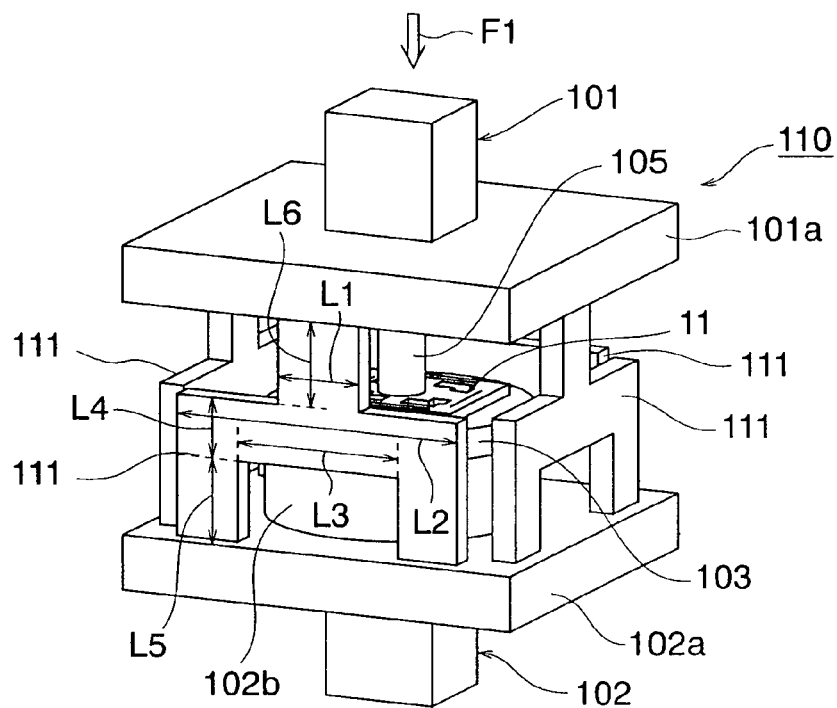
FIG. 7 is an external perspective view showing a modified example of the force sensor of the first embodiment.
Figure 8:
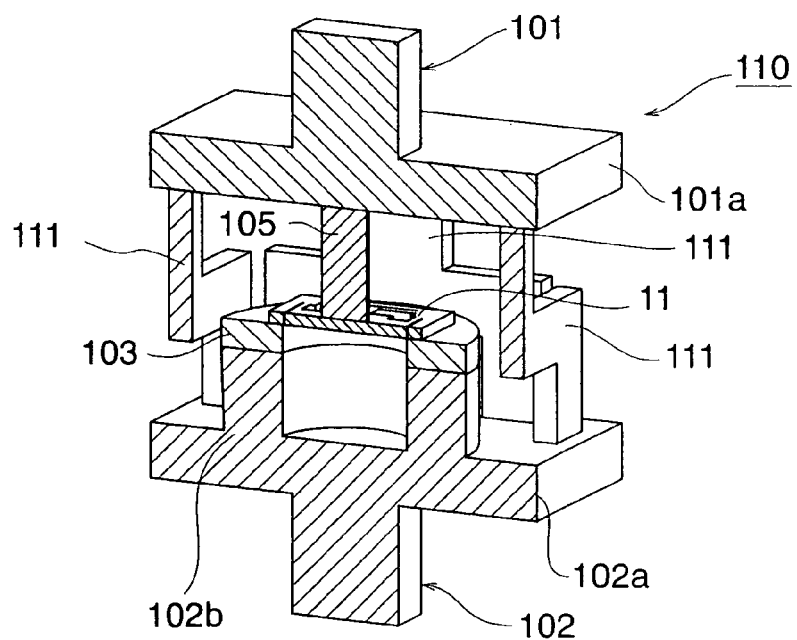
FIG. 8 is a cross-sectional perspective view showing a modified example of the force sensor of the first embodiment.

Following is a description, made with reference to FIGS. 7 and 8, of a modified example of the force sensor of the first embodiment. The force sensor 110 can be considered to be more practical than the force sensor 100, in certain service modes. The same reference numerals are assigned to substantially the same components as those described in FIGS. 1 and 2, and a description thereof is omitted. In the force sensor 110, the buffering device 12 is composed of four dampening mechanisms 111. The four dampening mechanisms 111 are disposed in correspondence with the four corners of the rectangular plate 101a of the input portion 101 and the rectangular supporting plate 102a of the sensor mount 102, and the input portion 101 and sensor mount 102 are connected to each other. The dampening mechanisms 111 have a substantially inverse Y-shape or structure, and the lower side has a bifurcated shape. The plate 101a of the input portion 101 is coupled to one end of the upper side of the dampening mechanisms 111, and the supporting plate 102a of the sensor mount 102 is coupled to the two ends of the lower side of the dampening mechanisms 111. The other features of the configuration are the same as in the force sensor 100.

FIGS. 9A to 9D show modified examples of the overall shape of the force sensor 110 when, for example, four axial forces Fx, Fz, My, and Mz are applied to the force sensor 110. FIG. 9A shows the deformation state when an axial force Fx is applied. FIG. 9B shows the deformation state when an axial force Fz is applied. FIG. 9C shows the deformation state when an axial force My is applied. FIG. 9D shows the deformation state when an axial force Mz is applied. The dampening mechanism 111 deforms in accordance with the axial forces that produce the deformation states shown in FIGS. 9A to 9D, and the dampening mechanism 111 absorbs a majority (e.g., 90%) of the axial force applied to the input portion 101. For convenience of description, the deformation states of the deformation patterns shown in FIGS. 9A to 9D are exaggerated depictions.

In accordance with the force sensor 110 of the modified example of the first embodiment, the function of the dampening mechanism 111 to dampen the external force F1 can be adjusted by freely adjusting the size, shape (thickness, length, and other parameters), and other aspects of the inverse Y-shaped portion of the dampening mechanism 111. More specifically, a force can be detected with greater balance and precision by appropriately adjusting the thickness, the dimensions L1 to L6, and other parameters of the dampening mechanism 111 in FIG. 7, for example. In other words, force sensor the external force-dampening function of the force sensor 110 can be more easily adjusted than the force sensor 100 described in FIG. 1. The force sensor also has the advantage that a degree of design freedom can be ensured when adjusting the load carrying capacity, adjusting the sensitivity to the axial forces, and making other adjustments. The Y-shaped dampening mechanism 111 can be turned upside down and disposed between the plate 101a and supporting plate 102a. The force sensors 100 and 110 were described above using examples in which the plate 101a and supporting plate 102a had a square upper surface, but it is also possible to provide a plate 101a and supporting plate 102a having a circular shape, an equilateral triangular shape, or another shape.

The second embodiment of the force sensor of the present invention is described next with reference to FIGS. 10 to 15. The force sensor of this embodiment has a cylindrical shape.

Figure 10:
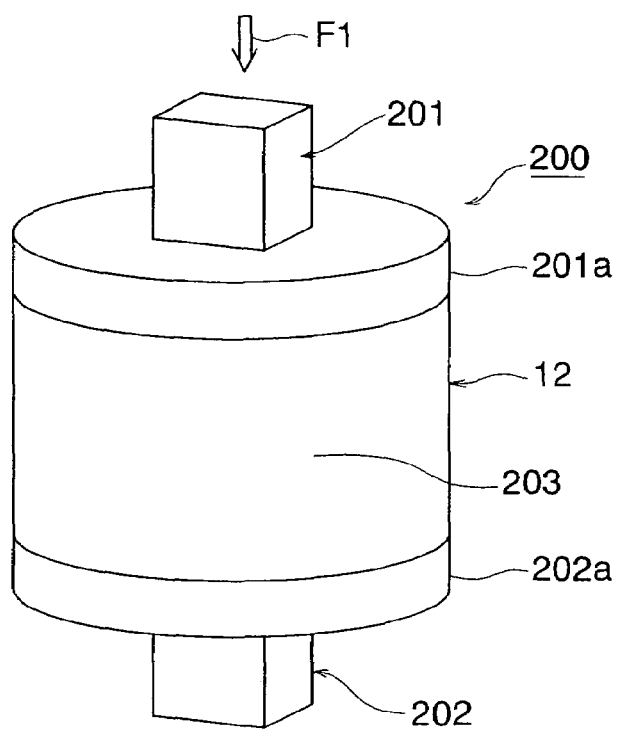
FIG. 10 is an external perspective view of a force sensor showing the second embodiment of the force sensor of the present invention.
Figure 11:
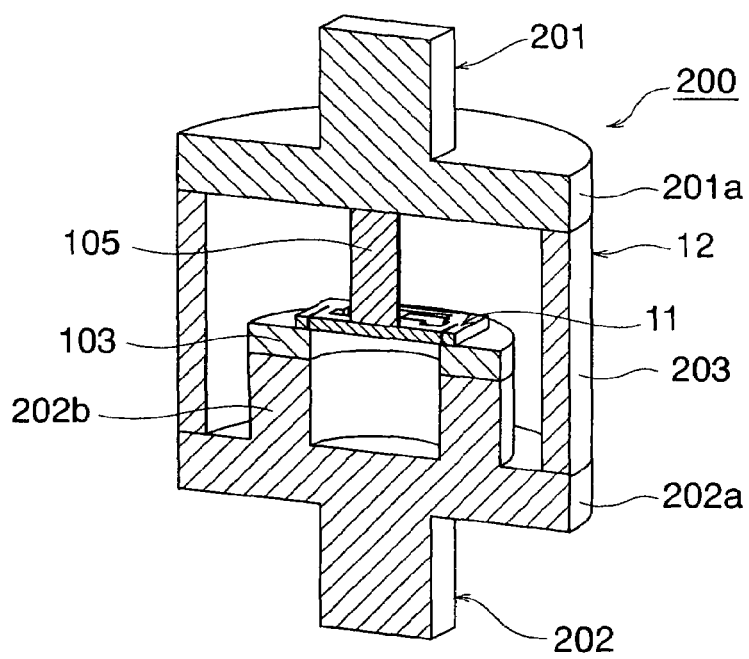
FIG. 11 is a cross-sectional perspective view of the force sensor of the second embodiment.
Figure 12:
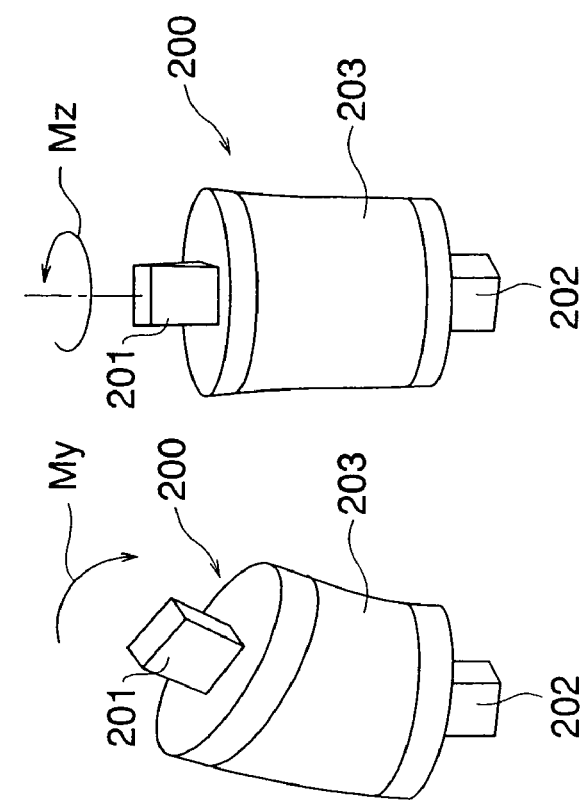
FIGS. 12A to 12D are perspective views showing the deformation states that correspond to the four-types of axial forces (Fx, Fz, My, Mz), respectively, of the force sensor of the second embodiment.

Following is a description, made with reference to FIGS. 10 and 11, of a force sensor 200 having a simple shape and structure according to the second embodiment. FIG. 10 is an external perspective view of a force sensor 200, and FIG. 11 is a cross-sectional perspective view of the internal structure of the force sensor 200. In FIGS. 10 and 11, the same reference numerals are assigned to substantially the same components as those described in the first embodiment, and a description thereof is omitted.

The main part of the force sensor 200 comprises a force sensor chip 11 and a buffering device 12. The force sensor chip 11 is the same as the one described in the first embodiment. The force sensor 200 is, more specifically, composed of an input portion 201 to which external force (axial force or load) F1 is directly applied from the exterior, a sensor mount 202 for fixing the force sensor 200 in a required location, a chip base 103 for mounting the above-described force sensor chip 11, a cylindrical portion 203 having a dampening or buffering function, and a transmission portion 105 for coupling the input portion 201 and active sensing portion 21 of the force sensor chip 11. The cylindrical portion 203 forms the dampening mechanism of the buffering device 12 described above.

The input portion 201 and sensor mount 202 form a sensor casing. The input portion 201 has a circular plate 201a that acts as a sensor casing. The sensor mount 202 is composed of a circular supporting plate 202a that acts as a sensor casing, and a cylindrical portion 202b to whose upper surface the chip base 103 is fixed. The diameters of the plate 201a and supporting plate 202a, and the external diameter of the cylindrical portion 203 are designed substantially equal to each other. The plate 201a and supporting plate 202a are disposed in parallel, and the cylindrical portion 203 is disposed therebetween so as to couple the two portions. The force sensor 200 has an overall cylindrical shape. However, the diameters of the plate 201a and supporting plate 202a can be varied and may serve as a force sensor 200 having a conical buffering device 12.

The cylindrical portion 203 functions as a dampening mechanism of the buffering device 12, which dampens the external force F1 applied to the input portion 201 and applies the force to the force sensor chip 11.

FIGS. 12A to 12D show modified examples of the overall shape of the force sensor 200 when axial forces Fx, Fz, My, and Mz, for example, are applied to the force sensor 200. FIG. 12A shows the deformation state when an axial force Fx is applied. FIG. 12B shows the deformation state when an axial force Fz is applied. FIG. 12C shows the deformation state when an axial force My is applied. FIG. 12D shows the deformation state when an axial force Mz is applied. The cylindrical portion 203, which is a dampening mechanism, deforms in accordance with the axial forces that produce the deformation states shown in FIGS. 12A to 12D, and the cylindrical portion 203 absorbs a majority (e.g., 90%) of the axial force applied to the input portion 201. For convenience of description, the deformation states of the deformation patterns shown in FIGS. 12A to 12D are exaggerated depictions.

The force sensor 200 has an overall cylindrical shape, and is therefore advantageous in that the sensor has no corners and the spatial degree of freedom for its application is high in comparison with the first embodiment. The force sensor 200, for example, can be used in applications in which the sensor is placed inside portions of an apparatus having cylindrical shapes, such as the arm portion of an industrial robot.

As components of the force sensor 200, the casing portions can be easily machined by lathing since the upper and lower sensor casing portions (input portion 201, sensor mount 202, and cylindrical portion 203) are cylindrical. This is advantageous because manufacturing is facilitated and high machining precision can be obtained. Furthermore, the dampening mechanism (cylindrical portion 203) and the input portion 201, or the cylindrical portion 203 and the sensor mount 202 can easily be formed as a single component, and the manufacturing costs can be reduced in comparison with the cube-shaped force sensors 100 and 110 described above in the first embodiment.

Figure 13:
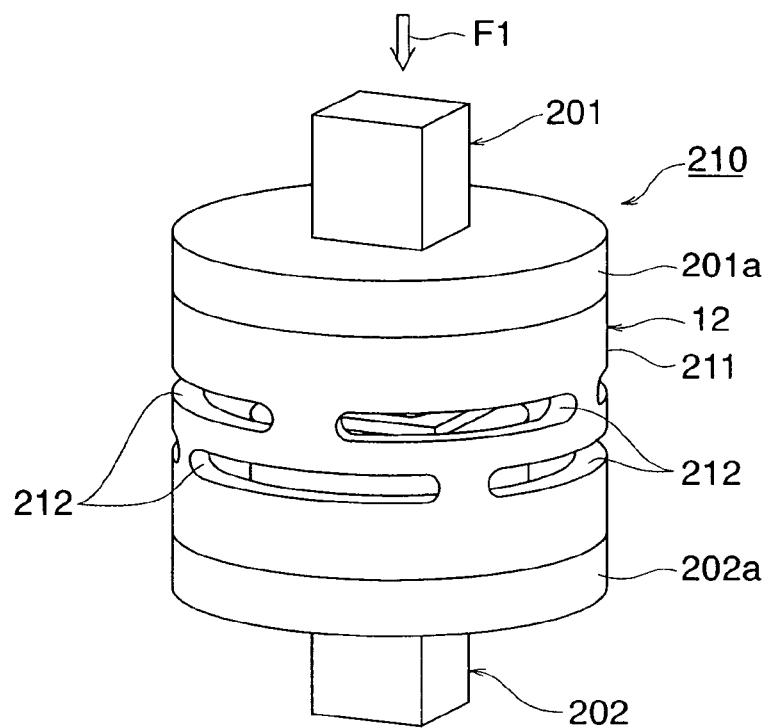
FIG. 13 is an external perspective view showing a modified example of the force sensor of the second embodiment.
Figure 14:
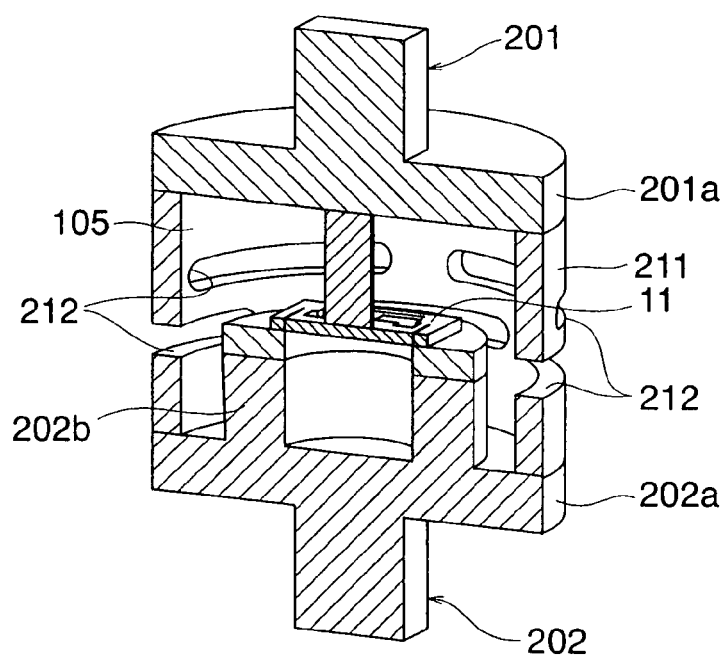
FIG. 14 is a cross-sectional perspective view showing a modified example of the force sensor of the second embodiment.

Following is a description, made with reference to FIGS. 13 and 14, of a modified example of the force sensor of the second embodiment. The force sensor 210 has a practically implementable shape and structure. The same reference numerals are assigned to substantially the same components as those described in FIGS. 10 and 11, and a description thereof is omitted. In the force sensor 210, the cylindrical portion 211, which is a dampening mechanism, has the same overall shape as the above-described cylindrical portion 203, and is machined so that holes 212 are formed in the circumferential direction. The holes 212 are formed as long holes. The number, shape, and position of the holes 212 are arbitrary, but considering the symmetry of the deformation of the cylindrical portion 211, it is practical to also symmetrically arrange the holes 212 in advance in the shaft of the force sensor 210. The other features of the configuration are the same as in the force sensor 200 described with reference to FIGS. 10 and 11.

FIGS. 15A to 15D show modified examples of the overall shape of the force sensor 210 when axial forces Fx, Fz, My, and Mz, for example, are applied to the force sensor 210. FIG. 15A shows the deformation state when an axial force Fx is applied. FIG. 15B shows the deformation state when an axial force Fz is applied. FIG. 15C shows the deformation state when an axial force My is applied. FIG. 15D shows the deformation state when an axial force Mz is applied. The cylindrical portion 211, which is a dampening mechanism, deforms in accordance with the axial forces that produce the deformation states shown in FIGS. 15A to 15D, and the cylindrical portion 211 absorbs a majority (e.g., 90%) of the axial force applied to the input portion 201. For convenience of description, the deformation states of the deformation patterns shown in FIGS. 15A to 15D are exaggerated depictions.

In accordance with the force sensor 210 of the modified example of the second embodiment, a bridge structure is formed by providing holes 212 to the cylindrical portion 211 that forms the dampening mechanism. The external force-dampening function of the cylindrical portion 211 can be appropriately adjusted by appropriately adjusting the size, shape, number, position, and other parameters of the holes 212. In accordance with the above-described force sensor 210, the external force-dampening function can be more easily adjusted than in the case of the force sensor 200 described in FIG. 7 and other diagrams, and there is also an advantage in that the degree of freedom in designing the force sensor is greater in terms of adjusting the load carrying capacity, adjusting the sensitivity to the axial forces, and making other adjustments.

The force sensors 200 and 210 were described above using examples in which plates 201a and 202a had a circular upper surface, but it is also possible to provide plates 201a and 202a having a square shape, an equilateral triangular shape, or another shape.

In this case, the force sensors 200 and 210 have a structure in which the cylindrical portions 203 and 211 encompass the entire periphery. Therefore, the force sensor chip 11 can be sealed better than the force sensors 100 and 110, and this structure can be considered to be more preferred from the viewpoint of being dustproof, blocking light, and having other characteristics, depending on the service conditions of the force sensor. It can also be considered that the symmetry of deformation induced by the external force F1 is superior in comparison with the force sensors 100 and 110, in which the input portion 101 and sensor mount 102 are coupled by four transmission portions 105 or dampening mechanisms 111. This is because the force sensors 200 and 210 have a structure that encompasses the entire periphery in a symmetrical fashion about the center axis of the force sensor chip 11.

The third embodiment of the force sensor of the present invention is described next with reference to FIGS. 16 to 17. The force sensor of this embodiment has a toroidal shape.

Figure 16:
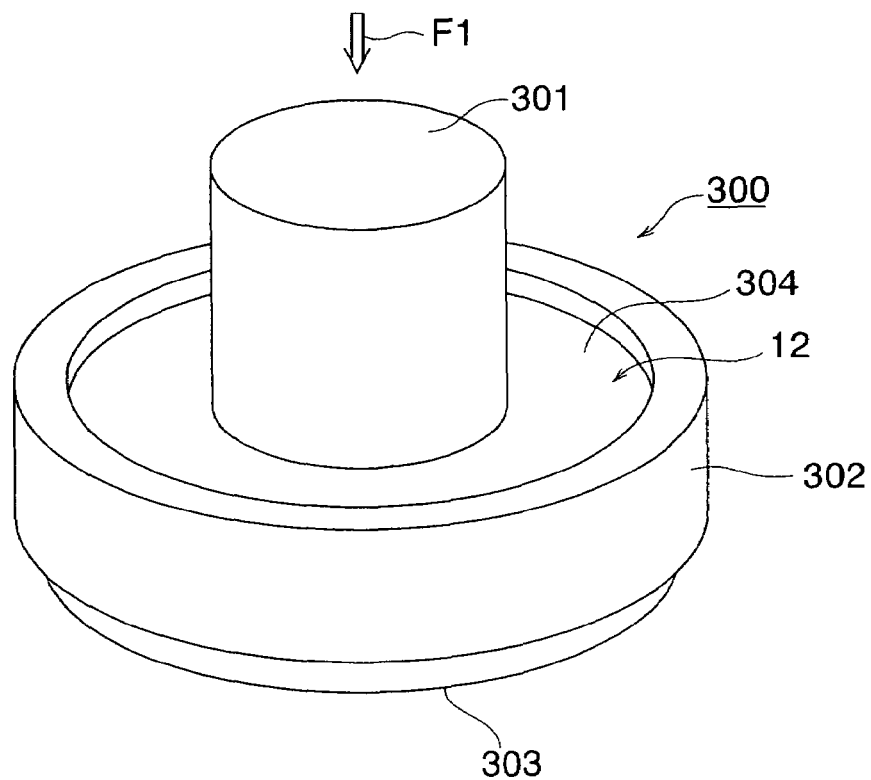
FIG. 16 is an external perspective view of a force sensor showing the third embodiment of the force sensor of the present invention.
Figure 17:
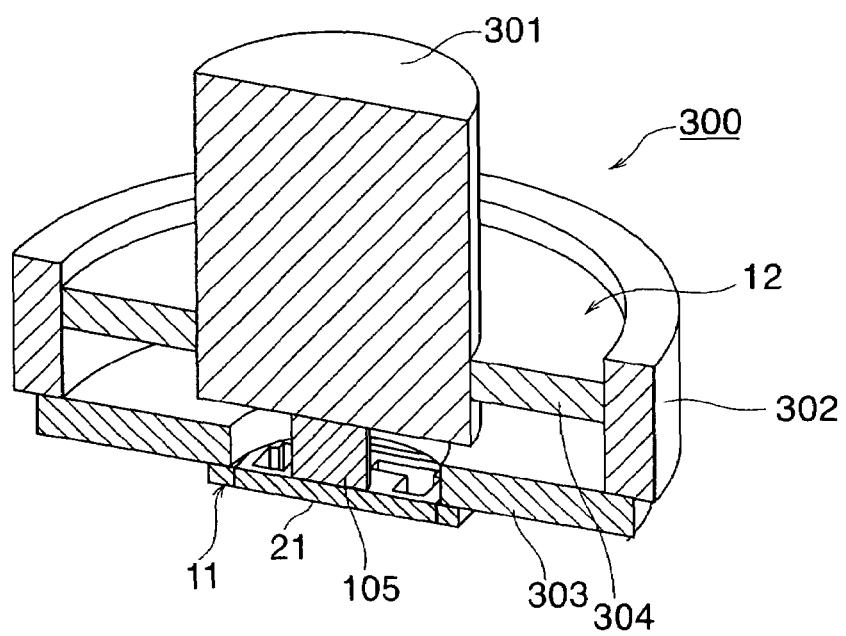
FIG. 17 is a cross-sectional perspective view of the force sensor of the third embodiment.

Following is a description, made with reference to FIGS. 16 and 17, of a force sensor 200 having a simple shape and structure according to the third embodiment. FIG. 16 is an external perspective view of a force sensor 300, and FIG. 17 is a cross-sectional perspective view of the internal structure of the force sensor. In FIGS. 16 and 17, the same reference numerals are assigned to substantially the same components as those described in the first embodiment, and a description thereof is omitted.

The force sensor 300 of this embodiment is principally composed of a force sensor chip 11 and a buffering device 12. The force sensor chip 11 is the same as the one described in the first embodiment. The force sensor 300 is, more specifically, composed of a cylindrical rod-shaped input portion 301 to which external force (axial force or load) F1 is directly applied from the exterior; a relatively flat, cylindrical (or ring-shaped) sensor mount 302 which is short in the axial direction and which is used to fix the force sensor 300 in a required location; a disc-shaped chip base 303 for mounting the above-described force sensor chip 11; a disc 304 having a dampening or buffering function; and a transmission portion 105 for coupling the input portion 301 and active sensing portion 21 of the force sensor chip 11. The disc 304 forms the dampening mechanism of the buffering device 12 described above.

The disc 304 and disc-shaped chip base 303 are disposed in parallel in relatively proximate positions. The disc 304 and chip base 303 are both provided with holes in the center area. The input portion 301, sensor mount 302, and disc 304 are assembled in the manner shown in FIG. 16. These may be manufactured as an integrated component. The force sensor chip 11 is fixed to a position on the lower side (exterior) of the chip base 303 in the portion having a hole in the center of the circular chip base 303. The rod-shaped transmission portion 105 passes through the hole in the chip base 303 and is connected to the active sensing portion 21 of the force sensor chip 11 and the lower surface of the input portion 301.

In the force sensor of the first and second embodiments described above, the chip base and the transmission portion that transmits external force are in contact with different sides (front and back) of the force sensor chip 11, but in the force sensor 300 of the present embodiment thus configured, the chip base 303 and transmission portion 105 are in contact with the same side of the force sensor chip 11. The entire structure of the buffering device 12 is placed on the same side of the force sensor chip 11 (the upper side of the force sensor chip 11 in FIG. 17) by adopting a layout such as that of buffering device 12 shown in FIGS. 16 and 17, and the force sensor chip 11 can be bonded following integral formation of two or more components selected from the input portion 301, disc 304, sensor mount 302, transmission portion 105, and chip base 303, thereby contributing to the simplification of the manufacturing process. Integrally forming all or a part of the portion that reaches from the input portion 301 to the disc 304 leads to a reduction in the amount of adhesive that is used.

The force sensor 300 is thinner in the vertical direction. This is more evident when compared with the force sensor 100 (FIG. 2) and 200 (FIG. 11). In the force sensor 300, the transmission portion 105, disc 304, and chip base 303 are disposed on the same side of the force sensor chip 11 in order to achieve a thinner profile. A disc 304 is disposed on the internal peripheral side of the sensor mount 302, and a transmission portion 105 is disposed on the internal peripheral side of the chip base 303.

The disc 304, which is a dampening mechanism, is fixed to the inner surface portion of the cylindrical or ring-shaped sensor mount 302. The chip base 303 is fixed to the lower edge of the sensor mount 302. The disc 304, which acts as a dampening mechanism, is fixed so that the rigidity of the disc is reduced with respect to the sensor mount 302 and chip base 303. Therefore, when an external force F1 is applied to the input portion 301, the disc 304 deforms due to the external force F1, and the external force F1 is dampened, weakened, and transmitted to the active sensing portion 21 of the force sensor chip 11. In this manner, the disc 304, which is a dampening mechanism, dampens the external force F1 applied to the input portion 301, and functions as a buffering device 12 of the force sensor chip 11.

FIGS. 18A to 18D show modified examples of the overall shape of the force sensor 300 when four axial forces Fx, Fz, My, and Mz, for example, are applied to the force sensor 300.

FIG. 18A shows the deformation state when an axial force Fx is applied. FIG. 18B shows the deformation state when an axial force Fz is applied. FIG. 18C shows the deformation state when an axial force My is applied. FIG. 18D shows the deformation state when an axial force Mz is applied. The disc 304, which is a dampening mechanism, deforms in accordance with the axial forces that produce the deformation states shown in FIGS. 18A to 18D, and the disc 304 absorbs a majority (e.g., 90%) of the axial force applied to the input portion 301. For convenience of description, the deformation states of the deformation patterns shown in FIGS. 18A to 18D are exaggerated depictions.

Figure 19:
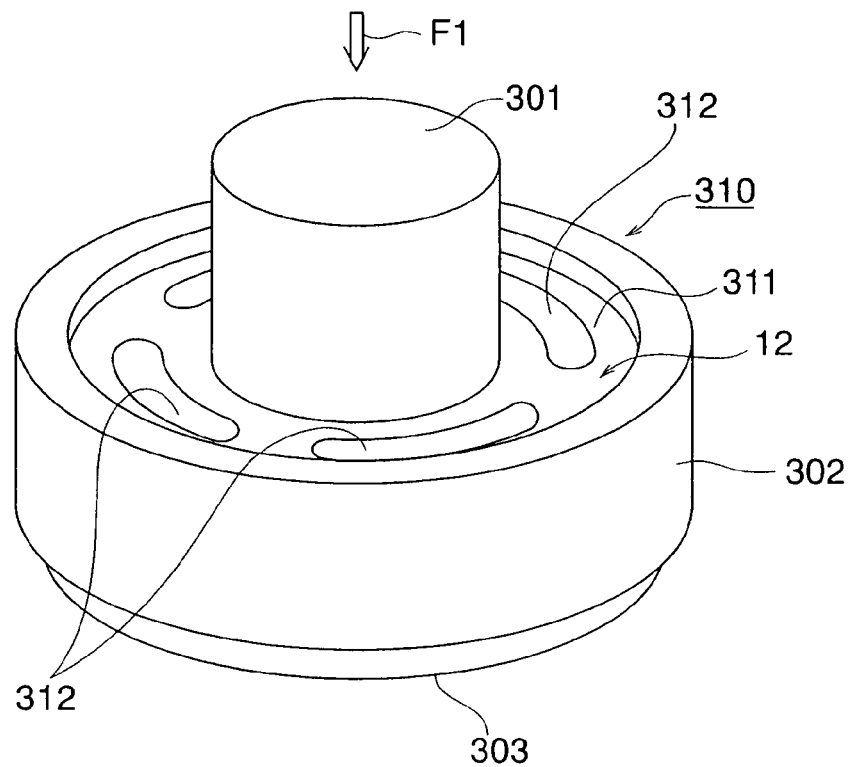
FIG. 19 is an external perspective view showing a modified example of the force sensor of the third embodiment.
Figure 20:
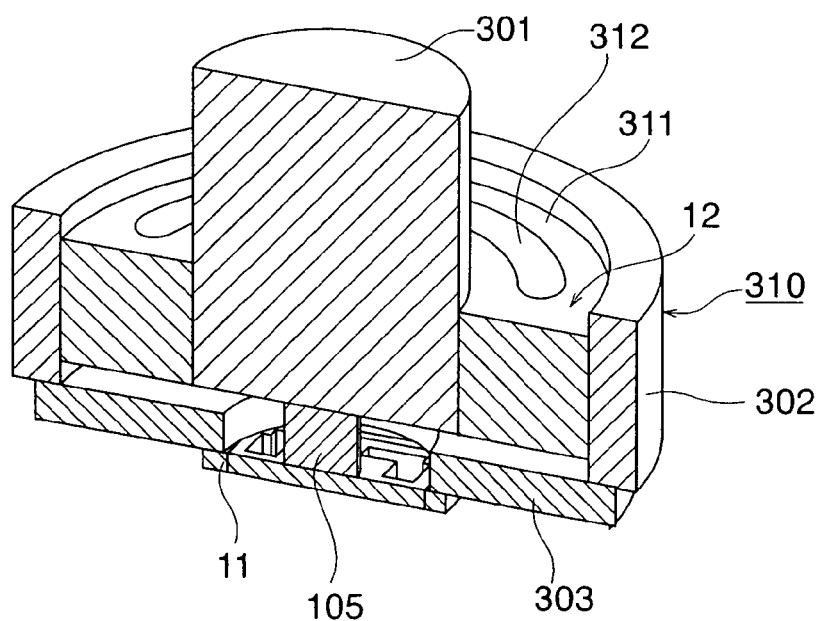
FIG. 20 is a cross-sectional perspective view showing a modified example of the force sensor of the third embodiment.

Following is a description, made with reference to FIGS. 19 and 20, of a modified example of the force sensor of the third embodiment. The force sensor 310 has a practically implementable shape and structure. The same reference numerals are assigned to substantially the same components as those described in FIGS. 16 and 17, and a description thereof is omitted. In the force sensor 310, the disc 311, which functions as a dampening mechanism of the buffering device 12, has the same overall shape and position as the as the above-described disc 304. However, the disc 311 is thicker and is machined so as to form holes 312. The number of holes 312 is arbitrary. The other features of the configuration are the same as in the force sensor 300 described with reference to FIGS. 16 and 17.

In accordance with the force sensor 310 of the modified example of the third embodiment, a bridge structure is formed by providing holes 312 to the disc 311 that forms the dampening mechanism. The external force-dampening function of the disc 311 can be freely adjusted by appropriately adjusting the size, shape, number, position, and other parameters of the holes 312. In the above-described force sensor 310, the external force-dampening function can be more easily adjusted than in the case of the force sensor 300 described in FIG. 16 and other diagrams, and there is also an advantage in that the degree of freedom in designing the force sensor is greater in terms of adjusting the load carrying capacity, adjusting the sensitivity to the axial forces, and making other adjustments.

The number, shape, and position of the holes 312 are arbitrary, but considering the symmetry of the deformation of the disc 311, it is practical to also symmetrically arrange the holes 312 in advance in the shaft of the force sensor 310.

The force sensors 300 and 310 were described above using examples in which the sensor mount 302, discs 304 and 311, and other components having a circular upper surface were provided, but it is also possible to provide a sensor mount 302, discs 304 and 311, and other components whose upper surface has a square shape, an equilateral triangular shape, or another shape.

FIGS. 21A to 21D show modified examples of the overall shape of the force sensor 310 when axial forces Fx, Fz, My, and Mz, for example, are applied to the force sensor 310. FIG. 21A shows the deformation state when an axial force Fx is applied. FIG. 21B shows the deformation state when an axial force Fz is applied. FIG. 21C shows the deformation state when an axial force My is applied. FIG. 21D shows the deformation state when an axial force Mz is applied. The disc 311, which is a dampening mechanism, deforms in accordance with the axial forces that produce the deformation states shown in FIGS. 21A to 21D, and the disc 311 absorbs a majority (e.g., 90%) of the axial force applied to the input portion 301. For convenience of description, the deformation states of the deformation patterns shown in FIGS. 21A to 21D are exaggerated depictions.

Figure 22:
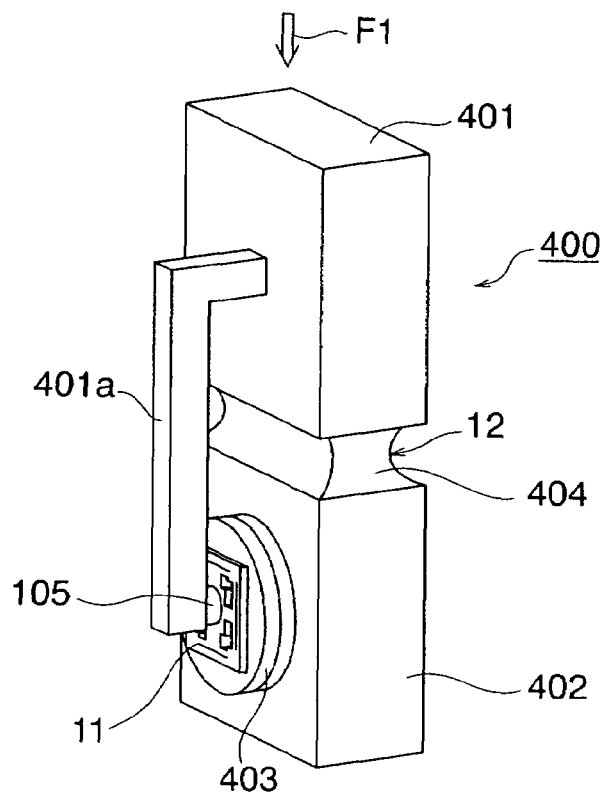
FIG. 22 is an external perspective view of a force sensor showing the fourth embodiment of the force sensor of the present invention.

Following is a description, made with reference to FIGS. 22 and 27, of a modified example of the force sensor of the fourth embodiment. The force sensor of this embodiment is rod-shaped.

Figure 23:
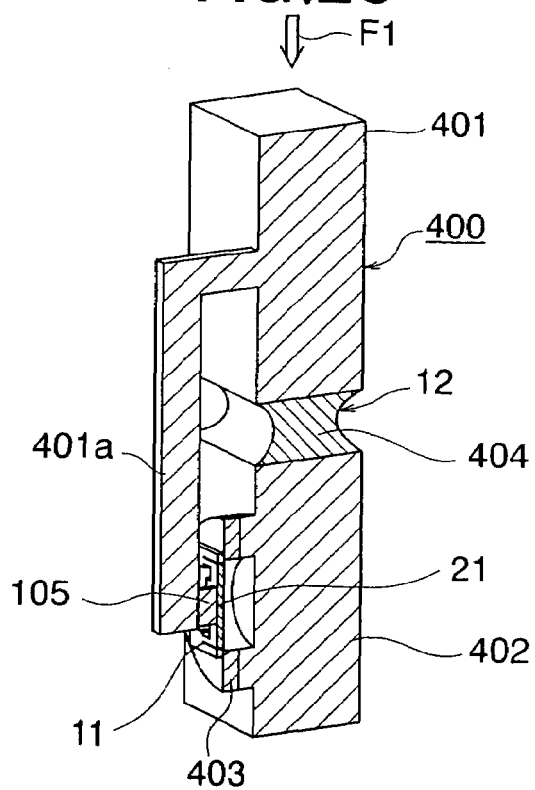
FIG. 23 is a cross-sectional perspective view of the force sensor of the fourth embodiment.

The force sensor having a simple shape and structure according to the fourth embodiment is described below with reference to FIGS. 22 and 23. FIG. 22 is an external perspective view of a force sensor, and FIG. 23 is a cross-sectional perspective view of the force sensor. In FIGS. 22 and 23, the same reference numerals are assigned to substantially the same components as those described in the first embodiment, and a description thereof is omitted.

The main part of the force sensor 400 of this embodiment comprises a force sensor chip 11 and a buffering device 12. The force sensor chip 11 is the same as the one described in the first embodiment. The force sensor 400 is, more specifically, composed of a block-shaped input portion 401 to which external force (axial force or load) F1 is directly applied from the exterior, a block-shaped sensor mount 402 for fixing the force sensor 400 in a required location, a disc-shaped chip base 403 for mounting the above-described force sensor chip 11, a connecting portion 404 having a dampening or buffering function, and a transmission portion 105 for coupling the input portion 401 and active sensing portion 21 of the force sensor chip 11. The input portion 401 and the sensor mount 402 are in a vertical positional relationship, and the force sensor 400 is itself provided with an overall rod-like shape. The input portion 401 has a downward-extending arm portion 401a. The connecting portion 404 functions as a connecting means positioned between the input portion 401 and the sensor mount 402 in the rod-shaped force sensor 400. The connecting portion 404 forms the dampening mechanism of the buffering device 12 described above.

The chip base 403 is disposed on the wall surface of the sensor mount 402 positioned on the lower side. The force sensor chip 11 is placed in the vertical direction on the surface of the force sensor 400 by bonding or otherwise mounting the force sensor chip 11 on the wall surface of the rod-shaped force sensor 400. Therefore, a rod-shaped force sensor that is thinner in the vertical direction can be manufactured in the case of the force sensor 400 of this embodiment.

The force sensor 400 is used as a more appropriate sensor configuration in cases in which a sensor mount 402 disposed at one end is fixed in place, an external force F1 is exerted on the input portion 401 at the other end and is detected, and in other cases in which the sensor is mounted in a rod-shaped structure.

FIGS. 24A to 24D show modified examples of the overall shape of the force sensor 400 when axial forces Fx, Fz, My, and Mz, for example, are applied to the force sensor 400. FIG. 24A shows the deformation state when an axial force Fx is applied. FIG. 24B shows the deformation state when an axial force Fz is applied. FIG. 24C shows the deformation state when an axial force My is applied. FIG. 24D shows the deformation state when an axial force Mz is applied. The connecting portion 404, which is a dampening mechanism, deforms in accordance with the axial forces that produce the deformation states shown in FIGS. 24A to 24D, and the connecting portion 404 absorbs a majority (e.g., 90%) of the axial force applied to the input portion 401. For convenience of description, the deformation states of the deformation patterns shown in FIGS. 24A to 24D are exaggerated depictions.

Figure 25:
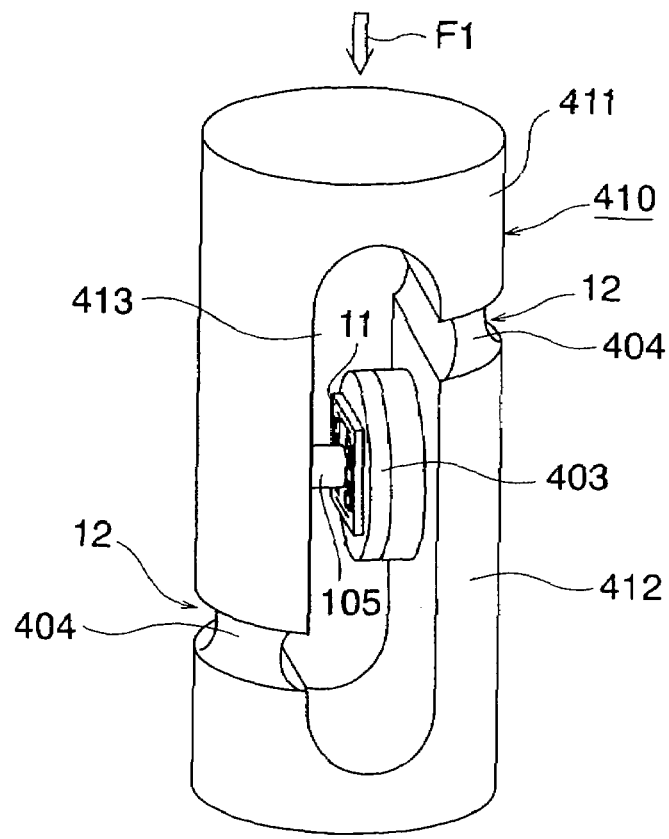
FIG. 25 is an external perspective view showing a modified example of the force sensor of the fourth embodiment.
Figure 26:
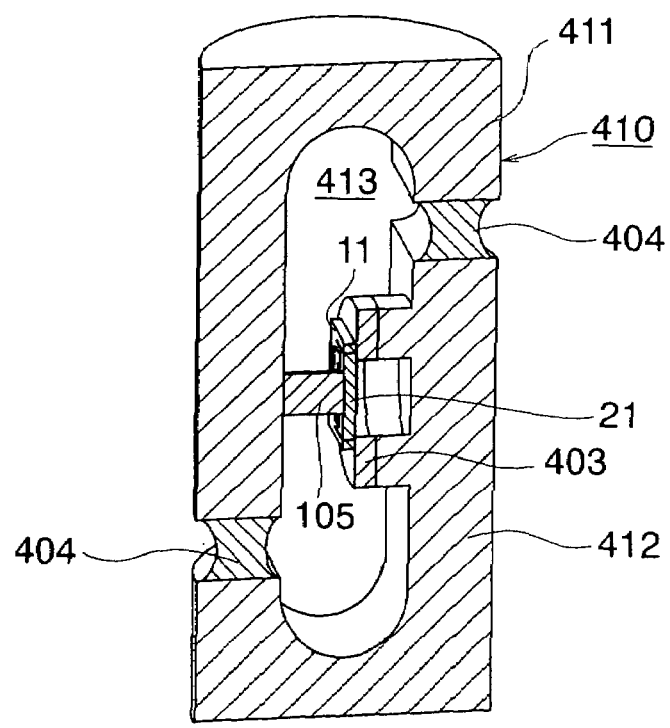
FIG. 26 is a cross-sectional perspective view showing a modified example of the force sensor of the fourth embodiment.

Following is a description, made with reference to FIGS. 25 and 26, of a modified example of the force sensor of the fourth embodiment. The force sensor 410 has a practically implementable shape and structure. In FIGS. 25 and 26, the same reference numerals are assigned to substantially the same components as those described in the first embodiment, and a description thereof is omitted.

The force sensor 410 is provided with an overall rod-like columnar shape. The force sensor 410 is composed of a block-shaped, substantially semicircular columnar input portion 411 to which external force (axial force or load) F1 is directly applied from the exterior; a block-shaped, substantially semicircular columnar sensor mount 412 for fixing the force sensor 410 in a required location; a ring-shaped chip base 403 for mounting the above-described force sensor chip 11; two connecting portions 404, which are dampening mechanisms; and a transmission portion 105 for coupling the input portion 411 and active sensing portion 21 of the force sensor chip 11.

The input portion 411 and sensor mount 412 form a force sensor 410 having an overall columnar shape. The input portion 411 and sensor mount 412 are configured to have a symmetrical shape when viewed from either portion. The input portion 411 and sensor mount 412 are coupled by a connecting portion 404 in two locations at the two ends of the portions. A space 413 is formed in the interior of the force sensor 410. The chip base 403 is disposed on the inside wall surface of the sensor mount 412 by making use of the space 413, and the force sensor chip 11 is fixed thereon. The opposing surface of the input portion 411 and active sensing portion 21 of the force sensor chip 11 are connected by the transmission portion 105.

The input portion 411 and sensor mount 412 are in a vertical positional relationship, and the force sensor 410 is itself provided with an overall rod-like shape. This fact also applies to the relationship between the input portion 401 and sensor mount 402 of the force sensor 400. The two connecting portions 404 acting as dampening mechanisms function as connecting means positioned between the input portion 411 and sensor mount 412 in the force sensor 410 having a rod-shaped, substantially columnar body. The two connection portions 404 function as the buffering device 12 described above.

FIGS. 27A to 27D show modified examples of the overall shape of the force sensor 410 when four axial forces Fx, Fz, My, and Mz, for example, are applied to the force sensor 410. FIG. 27A shows the deformation state when an axial force Fx is applied. FIG. 27B shows the deformation state when an axial force Fz is applied. FIG. 27C shows the deformation state when an axial force My is applied. FIG. 27D shows the deformation state when an axial force Mz is applied. The connecting portion 404, which is a dampening mechanism, deforms in accordance with the axial forces that produce the deformation states shown in FIGS. 27A to 27D, and the connecting portion 404 absorbs a majority (e.g., 90%) of the axial force applied to the input portion 411. For convenience of description, the deformation states of the deformation patterns shown in FIGS. 27A to 27D are exaggerated depictions.

In the force sensor 410 of the modified example of the fourth embodiment, the force sensor chip 11 is disposed in the center of the input portion 411, sensor mount 412, and two connecting portions 404. The deformation center of the force sensor chip 11 and the deformation center of the buffering device 12 of the force sensor 410 are therefore in alignment. As a result, the balance between the axial forces is more easily attained, and this fact is advantageous in terms of design. In the force sensor 410, the force sensor chip 11 is disposed inside the structure. Therefore, the arm portion 401a and the force sensor chip 11 do not protrude as such, and a force sensor whose surface is devoid of unnecessary corners can be obtained.

In the first to fourth embodiments described above, the input portion and the sensor mount were described as shared portions of the sensor casing, but these may also be configured as portions that are separate from the sensor casing. The shape, structure, and other aspects of the dampening mechanism that functions as a buffering device are not limited to the embodiments described above, and the mechanism can be formed with any other shape, structure, or other feature that has the same or similar function.

In the first to fourth embodiments described above, screws, adhesives (epoxy resin-based), anodic bonding, and the like can be arbitrarily selected in accordance with the material and composition of the constituent elements as a means for coupling the constituent elements of the buffering device 12.

Particularly preferred is the use of anodic bonding technology when glass and silicon, or glass and metal are to be bonded. This is due to the fact that when an adhesive is used for bonding, the difference in the temperature characteristics (coefficient of thermal expansion) in relation to the substrate is considerable, and age deterioration is greater than in the case of anodic bonding. These facts lead to a reduction in the sensor detection precision.

Figure 28:
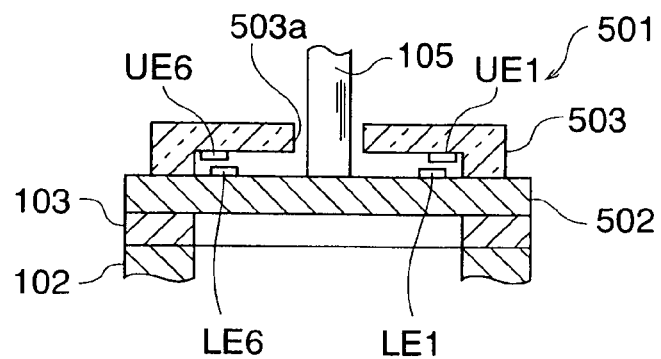
FIG. 28 is a longitudinal sectional view showing an. electrostatic-capacitance force sensor chip, which is another example of the force sensor chip used in the force sensor of the present invention.
Figure 29:
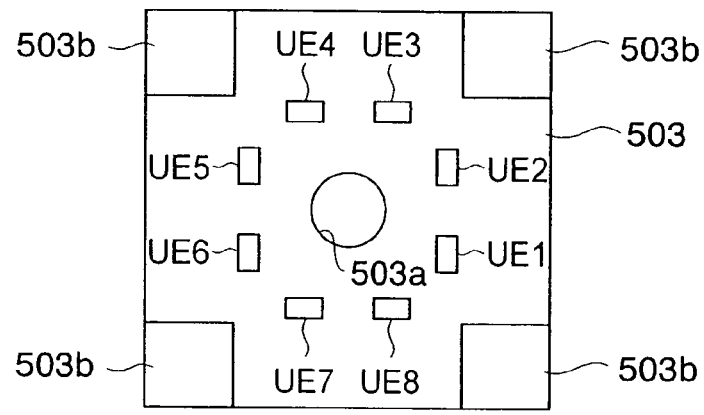
FIG. 29 is a diagram showing the lower surface of the top side of the glass plate of an electrostatic-capacitance force sensor chip.
Figure 30:
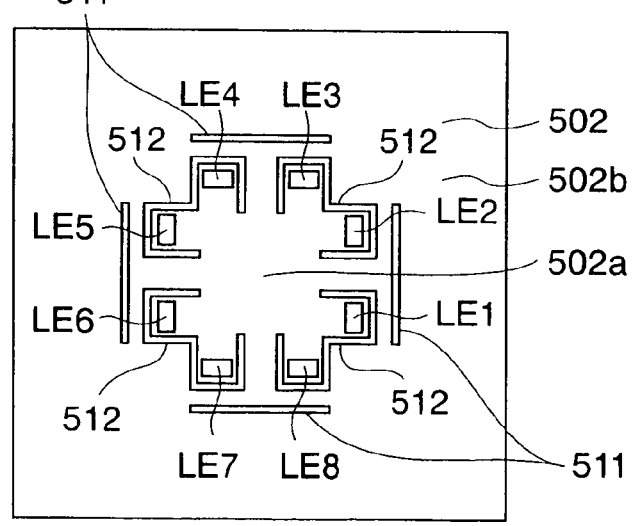
FIG. 30 is a diagram showing the upper surface of the bottom side of the semiconductor substrate of an electrostatic-capacitance force sensor chip.
Figure 31:
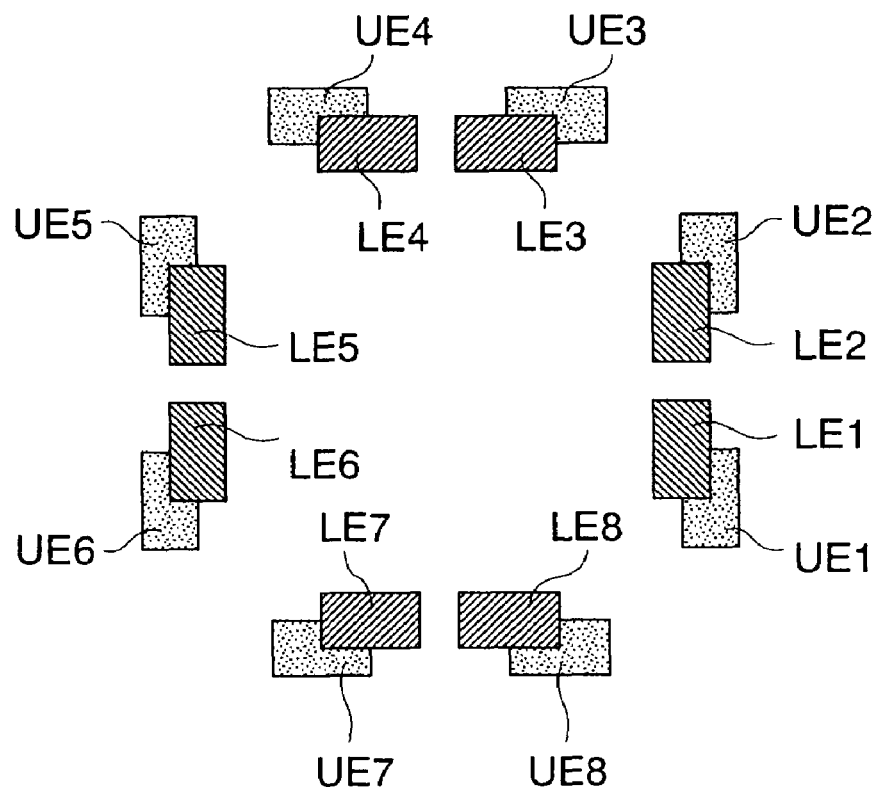
FIG. 31 is a diagram showing the position relationship between the electrodes of the glass plate and the electrodes of the semiconductor substrate.

The buffering device 12 of the present invention described with reference to FIGS. 1 to 27A through 27D is not limited to the force sensor chip 11 in which strain resistance elements are used, and can also be applied to other types of sensor chips. A general description of an electrostatic-capacitance force sensor chip to which the present invention can be applied is provided next with reference to FIGS. 28 to 31. FIG. 28 is a longitudinal sectional view of an electrostatic-capacitance force sensor chip. FIG. 29 is a bottom view of the top side of the glass plate. FIG. 30 is a top view of the bottom side of the semiconductor substrate. FIG. 31 is a diagram as viewed from the bottom side showing the positional relationship between the electrodes UE1 to UE8 of top side and the electrodes LE1 to LE8 of the bottom side.

The thickness is exaggerated in FIG. 28. The force sensor chip 501 is formed by anodically bonding or otherwise laminating the semiconductor substrate 502 positioned on the bottom side, and the glass plate 503 positioned on the upper side, as shown in FIG. 28. Eight electrodes LE1 to LE8 UE1 to UE8 are disposed in prescribed positions on each of the semiconductor substrate 502 and glass plate 503, respectively, as shown in FIGS. 29 to 31. The eight electrodes LE1 to LE8 of the semiconductor substrate 502 and the eight electrodes UE1 to UE8 of the glass plate 503 are in a positional relationship in which one is disposed above the other, having a partially overlapping portion. The center area of the semiconductor substrate 502 experiences external force and is displaced, altering the shape of the entire semiconductor substrate 502. The semiconductor substrate 502 functions as an essential component of the force sensor chip 501.

The semiconductor substrate 502 is provided with two types of holes 511 and 512 in the center area (active sensing portion) 502a and the peripherally area (support portion) 502b. The center area 502a experiences external force and is displaced. The peripheral area 502b is fixed so that its position does not change. The eight electrodes LE1 to LE8 described above are mounted in peripheral positions in the center area of the semiconductor substrate 502, as shown in FIG. 30. The glass plate 503 is provided with a center hole 503a and four peripheral projections 503b. The buffering device 12 or transmission portion 105 described passes completely through the center hole 503a of the glass plate 503. The distal end of the transmission portion 105 that passes through the center hole 503a of the glass plate 503 is fixed to the center area 502a of the semiconductor substrate 502 by bonding or the like. The four peripheral projections 503b of the glass plate 503 are fixed to the semiconductor substrate 502 by a known anodic bonding method or the like. The peripheral projections 503b of the glass plate 503 are bonded or otherwise fixed to the peripheral area 502b of the semiconductor substrate 502.

The electrodes LE1 to LE8 and UE1 to UE8 are in an opposing relationship, as shown in FIG. 31. The surface area of the opposing portions varies, and the electrostatic capacitance can be established in accordance with the opposing surface area and the distance. External force is applied, for example, by the transmission portion 105 to the semiconductor substrate 502 on the lower side, as shown in FIG. 28. A sensor mount 102 is coupled to the semiconductor substrate 502 on the lower side by way of the above-described chip base 103. Therefore, when external force is applied to the force sensor provided with an electrostatic-capacitance force sensor chip 501, a portion of the dampened external force is applied to the center area 502a of the semiconductor substrate 502 by way of the transmission portion 105. As a result, the position of the center area 502a of the semiconductor substrate 502 varies with respect to the glass plate 503 that is essentially fixed to the sensor mount 102. Variation occurs in the relative positional relationships of each of the opposing electrode pairs, i.e., the electrodes LE1 to LE8 and UE1 to UE8 described above, in accordance with the movement of the center area 502a of the semiconductor substrate 502, and the electrostatic capacitance is reduced. It is therefore possible to detect applied external force by detecting variations in the electrostatic capacitance of the eight opposing electrode pairs.

In the above description, electrodes and wires are provided for other wiring connections on the semiconductor substrate 502 and glass plate 503, but these electrodes and wires are not depicted in FIGS. 28 to 31. Platinum, aluminum, gold, or the like can be used for these electrodes and wires. The space between the electrodes UE1 to UE8 disposed on the glass plate 503 and the electrodes LE1 to LE8 disposed on the semiconductor substrate 502 is ordinarily filled with air. The shape, position, and number of electrodes, and the shape, position, and number of holes described above are not limited by the above description, and any shape, position, and number may be used.

Figure 32:
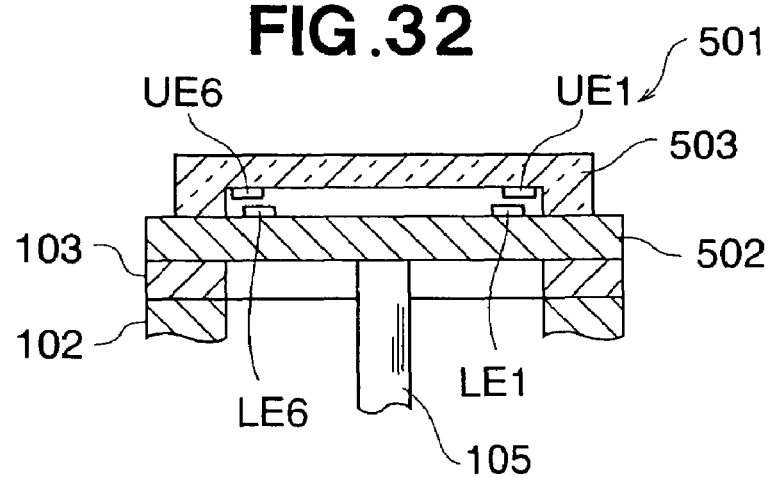
FIG. 32 is a longitudinal sectional view showing a structural example of an electrostatic-capacitance force sensor chip.

FIG. 32 shows a modified example of the force sensor chip 501. In FIG. 32, the same reference numerals are assigned to substantially the same components as those described in FIG. 28. In the mounting structure of the force sensor chip 501, the transmission portion 105 can be coupled with the center area 502a of the semiconductor substrate 502 from a location on the opposite side from the location in which the glass plate 503 is positioned, as shown in FIG. 32 force sensor. In this case, it would no longer be necessary to form the center area 503a on the glass plate 503.

The configuration, shape, size, and arrangement relationships described in the embodiments above merely provide a general overview in sufficient detail so that the present invention can be understood and implemented, and numbers and compositions (materials) of configurations are merely examples. The present invention is therefore not limited by the described embodiments, and modifications to various modes can be made as long as the modifications do not depart from the scope of the technical concepts described in the claims.

Obviously, various minor changes and modifications of the present invention are possible in light of the above teaching. It is therefore to be understood that within the scope of the appended claims the invention may be practiced otherwise than as specifically described.

What is claimed is:

1. A force sensor comprising:
   a force sensor chip having an active sensing portion to which a force is applied, a support portion for supporting the active sensing portion, and a force detector for detecting the force between the active sensing portion and the support portion; and
   a buffering device for dampening and applying the imparted external force to the force sensor chip,
   wherein the buffering device comprises:
      an input portion to which the external force is input;
      a sensor mount for fixing the force sensor chip;
      a dampening mechanism for dampening the external force; and
      a transmission portion for transmitting the dampened external force to the active sensing
      wherein the damping mechanism includes a plurality of structures each having a bifurcated shape, and
      wherein the bifurcated structures are spaced apart from each other on a periphery of the input portion and the sensor mount.

2. The force sensor according to claim 1, wherein the force detector comprises a plurality of strain resistance elements disposed in connection sections in which the active sensing portion and the support portion are connected.

3. The force sensor according to claim 1, wherein
   the input portion and the sensor mount have a plate-like part; and
   the input portion and the sensor mount are coupled by the dampening mechanism.

4. The force sensor according to claim 1, wherein each of the bifurcated structures of the damping mechanism has a two end portions coupled to one of the input portion or the sensor mount.

5. The force sensor according to claim 1, wherein a material for forming the dampening mechanism has lower rigidity than does a material for forming the input portion and the sensor mount.

6. The force sensor according to claim 1, further comprising:
   a chip base between the force sensor chip and the sensor mount; and
   the chip base being anodically bonded between the force sensor chip and the sensor mount.

7. The force sensor according to claim 1, further comprising:
   connection portions interconnecting the active sensing portion and the support portion, wherein the active sensing portion, the support portion and the connecting portions are defined by a plurality of through-hole portions provided in the force sensor chip.

8. The force sensor according to claim 7, wherein each of the connecting portions has a bridge portion and an elastic portion.

9. The force sensor according to claim 1, wherein each of the bifurcated structures of the dampening mechanism is a one-piece structure, and each of the one-piece structures is spaced apart from others of the one-piece structures.

10. A force sensor comprising:
    a force sensor chip having an active sensing portion to which a force is applied, a support portion for supporting the active sensing portion, and a force detector for detecting the force between the active sensing portion and the support portion; and
    a buffering device for dampening and applying the imparted external force to the force sensor chip, wherein the buffering device comprises:
- an input portion to which the external force is input;
- a sensor mount for fixing the force sensor chip;
- a dampening mechanism for dampening the external force; and
- a transmission portion for transmitting the dampened external force to the active sensing, wherein the dampening mechanism includes a plurality of structures each of having a substantially inverted Y-shape, and wherein the inverted Y-shaped structures are evenly spaced apart along the periphery of the input portion and the sensor mount.

\* \* \* \* \*